US012051026B2

(12) United States Patent
Prabhu et al.

(10) Patent No.: US 12,051,026 B2
(45) Date of Patent: Jul. 30, 2024

(54) COMPUTATIONAL UNIFIED GRAPH HIERARCHY MODEL

(71) Applicant: o9 Solutions, Inc., Dallas, TX (US)

(72) Inventors: Devaraya Prabhu, Flower Mound, TX (US); Koustuv Chatterjee, San Ramon, CA (US); Rajeev Karri, Bangalore (IN); Siddarth Wardhan, Bangalore (IN)

(73) Assignee: o9 Solutions, Inc., Dallas, TX (US)

( * ) Notice: Subject to any disclaimer, the term of this patent is extended or adjusted under 35 U.S.C. 154(b) by 427 days.

(21) Appl. No.: 16/166,924

(22) Filed: Oct. 22, 2018

(65) Prior Publication Data

US 2019/0258973 A1   Aug. 22, 2019

Related U.S. Application Data

(63) Continuation of application No. 14/493,277, filed on Sep. 22, 2014, now abandoned.

(51) Int. Cl.
*G06Q 10/00* (2023.01)
*G06Q 10/0637* (2023.01)
*G06Q 10/067* (2023.01)

(52) U.S. Cl.
CPC ....... *G06Q 10/067* (2013.01); *G06Q 10/0637* (2013.01)

(58) Field of Classification Search
None
See application file for complete search history.

(56) References Cited

U.S. PATENT DOCUMENTS

| 5,918,232 A | 6/1999 | Pouschine et al. |
| 5,953,707 A * | 9/1999 | Huang ........... G06Q 10/06 705/7.25 |

(Continued)

FOREIGN PATENT DOCUMENTS

WO   WO-2014032037 A1   2/2014

OTHER PUBLICATIONS

Ivan Herman, Member, Guy MelancËon, and M. Scott Marshall (Graph Visualization and Navigation in Information Visualization: A Survey, IEEE Transactions on Visualization and Computer Graphics, vol. 6, No. 1, Jan.-Mar. 2000). (Year: 2000).*

(Continued)

*Primary Examiner* — Hafiz A Kassim
(74) *Attorney, Agent, or Firm* — Schwegman Lundberg & Woessner, P.A.

(57) ABSTRACT

Systems and techniques for a computational unified graph hierarchy model are disclosed herein. A set of source data may be received that may include entity data and relationship data. An entity may be identified in the entity data. A hierarchy may be determined for the entity. An entity graph network may be generated. A non-hierarchical link between the entity and a related entity may be determined. The entity graph network may be updated to include the non-hierarchical link. A set of measures may be generated for a relational link of the entity. A dependency may be configured between the set of measures for the relational link and a second set of measures of a second relational link. A change may be identified to a value of a measure and a dependent entity node measure value may be updated based on a computational effect of the change to the value.

17 Claims, 20 Drawing Sheets

(56) References Cited

U.S. PATENT DOCUMENTS

| | | | |
|---|---|---|---|
| 6,754,677 B1* | 6/2004 | Cho | G06Q 10/10 |
| 6,978,379 B1* | 12/2005 | Goh | G06F 21/604 |
| | | | 713/1 |
| 6,983,237 B2 | 1/2006 | Paterson et al. | |
| 7,003,504 B1* | 2/2006 | Angus | G06F 16/254 |
| 7,165,037 B2 | 1/2007 | Lazarus et al. | |
| 7,222,302 B2 | 5/2007 | Hauser et al. | |
| 7,437,277 B2 | 10/2008 | Benayon et al. | |
| 7,571,082 B2 | 8/2009 | Gilpin et al. | |
| 7,711,588 B2 | 5/2010 | Ouimet | |
| 7,756,901 B2 | 7/2010 | Thier | |
| 7,835,893 B2 | 11/2010 | Cullick et al. | |
| 7,840,599 B2* | 11/2010 | Beadles | H04L 41/22 |
| | | | 707/792 |
| 7,861,215 B2 | 12/2010 | Tong et al. | |
| 7,904,327 B2 | 3/2011 | Phelan et al. | |
| 7,908,159 B1 | 3/2011 | Ordonez | |
| 7,917,344 B2 | 3/2011 | Butine | |
| 7,971,180 B2 | 6/2011 | Kreamer et al. | |
| 7,979,248 B2 | 7/2011 | Benayon et al. | |
| 8,145,518 B2 | 3/2012 | Cao et al. | |
| 8,175,911 B2 | 5/2012 | Cao et al. | |
| 8,180,623 B2 | 5/2012 | Lendermann et al. | |
| 8,195,709 B2* | 6/2012 | Pulfer | G06Q 10/06 |
| | | | 707/802 |
| 8,209,216 B2 | 6/2012 | Whipkey et al. | |
| 8,214,238 B1 | 7/2012 | Fairfield et al. | |
| 8,214,246 B2 | 7/2012 | Springfield et al. | |
| 8,260,587 B2 | 9/2012 | Sanchez et al. | |
| 8,275,974 B2* | 9/2012 | Voshell | G06F 16/2423 |
| | | | 712/212 |
| 8,285,582 B2* | 10/2012 | Bateni | G06Q 30/0202 |
| | | | 705/7.31 |
| 8,306,845 B2 | 11/2012 | D'imporzano et al. | |
| 8,311,863 B1 | 11/2012 | Kemp | |
| 8,352,397 B2 | 1/2013 | Rubin et al. | |
| 8,359,216 B2 | 1/2013 | Cao et al. | |
| 8,386,300 B2 | 2/2013 | April et al. | |
| 8,412,548 B2 | 4/2013 | Benayon et al. | |
| 8,612,262 B1 | 12/2013 | Condon et al. | |
| 8,712,812 B2 | 4/2014 | Snow et al. | |
| 2001/0004520 A1 | 6/2001 | Nomoto et al. | |
| 2001/0027455 A1* | 10/2001 | Abulleil | G06Q 10/06 |
| 2001/0049595 A1* | 12/2001 | Plumer | G06Q 10/00 |
| | | | 703/22 |
| 2001/0053991 A1 | 12/2001 | Bonabeau | |
| 2002/0065888 A1 | 5/2002 | Wall et al. | |
| 2002/0169658 A1 | 11/2002 | Adler | |
| 2003/0187717 A1 | 10/2003 | Crites et al. | |
| 2004/0138934 A1 | 7/2004 | Johnson et al. | |
| 2004/0162743 A1 | 8/2004 | Thier | |
| 2004/0181378 A1 | 9/2004 | Gilmore | |
| 2004/0186764 A1* | 9/2004 | McNeill | G06Q 10/10 |
| | | | 705/7.29 |
| 2004/0210509 A1 | 10/2004 | Eder | |
| 2005/0074806 A1* | 4/2005 | Skierczynski | G16B 40/00 |
| | | | 435/6.13 |
| 2005/0096950 A1 | 5/2005 | Caplan | |
| 2005/0246215 A1 | 11/2005 | Rackham | |
| 2005/0261787 A1 | 11/2005 | Plante | |
| 2005/0262081 A1* | 11/2005 | Newman | G06F 16/904 |
| 2006/0005164 A1* | 1/2006 | Jetter | G06F 16/34 |
| | | | 717/113 |
| 2006/0031048 A1 | 2/2006 | Gilpin et al. | |
| 2006/0069585 A1 | 3/2006 | Springfield et al. | |
| 2006/0085440 A1* | 4/2006 | Jandhyala | G06F 16/10 |
| 2006/0116922 A1 | 6/2006 | Homann et al. | |
| 2006/0129518 A1 | 6/2006 | Andreev et al. | |
| 2006/0242154 A1* | 10/2006 | Rawat | G06F 16/168 |
| 2007/0038465 A1 | 2/2007 | Jang et al. | |
| 2007/0038501 A1 | 2/2007 | Lee et al. | |
| 2007/0078869 A1 | 4/2007 | Carr et al. | |
| 2007/0118419 A1 | 5/2007 | Maga et al. | |
| 2007/0156677 A1 | 7/2007 | Szabo | |
| 2007/0299743 A1 | 12/2007 | Staib et al. | |
| 2008/0004922 A1 | 1/2008 | Eder | |
| 2008/0004924 A1 | 1/2008 | Cao et al. | |
| 2008/0034012 A1* | 2/2008 | Novik | G06F 16/1787 |
| 2008/0066067 A1 | 3/2008 | Stimpson et al. | |
| 2008/0097802 A1* | 4/2008 | Ladde | G06Q 10/06395 |
| | | | 705/7.11 |
| 2008/0109458 A1* | 5/2008 | Cosby | G06Q 10/10 |
| 2008/0126394 A1 | 5/2008 | Jain et al. | |
| 2008/0133299 A1 | 6/2008 | Sitarski | |
| 2008/0140688 A1* | 6/2008 | Clayton | G06Q 10/0637 |
| 2008/0162480 A1 | 7/2008 | Clayton et al. | |
| 2008/0172273 A1 | 7/2008 | Rackham et al. | |
| 2008/0221940 A1 | 9/2008 | Cohn et al. | |
| 2008/0235179 A1 | 9/2008 | Kurien et al. | |
| 2008/0243912 A1 | 10/2008 | Azvine et al. | |
| 2008/0306895 A1* | 12/2008 | Karty | G06Q 10/04 |
| | | | 706/52 |
| 2008/0312980 A1* | 12/2008 | Boulineau | G06Q 10/06 |
| | | | 705/7.13 |
| 2008/0313110 A1 | 12/2008 | Kreamer | |
| 2009/0006156 A1* | 1/2009 | Hunt | G06Q 30/02 |
| | | | 705/7.11 |
| 2009/0018879 A1 | 1/2009 | Flaxer et al. | |
| 2009/0192867 A1* | 7/2009 | Farooq | G06Q 10/06 |
| | | | 705/7.29 |
| 2009/0319246 A1* | 12/2009 | Takayama | G06F 30/3312 |
| | | | 703/13 |
| 2010/0070251 A1 | 3/2010 | Sanchez et al. | |
| 2010/0082381 A1 | 4/2010 | Merrifield, Jr. et al. | |
| 2010/0082386 A1 | 4/2010 | Cao et al. | |
| 2010/0082387 A1* | 4/2010 | Cao | G06Q 10/06 |
| | | | 705/7.38 |
| 2010/0082521 A1* | 4/2010 | Meric | G06Q 10/00 |
| | | | 706/53 |
| 2010/0082696 A1 | 4/2010 | Cao et al. | |
| 2010/0106555 A1* | 4/2010 | Mneimneh | G06Q 10/04 |
| | | | 705/7.31 |
| 2010/0106561 A1* | 4/2010 | Peredriy | G06Q 10/04 |
| | | | 705/7.31 |
| 2010/0153179 A1* | 6/2010 | Bateni | G06Q 30/0202 |
| | | | 705/7.31 |
| 2010/0161360 A1 | 6/2010 | Clement et al. | |
| 2010/0179794 A1 | 7/2010 | Shah et al. | |
| 2010/0281241 A1 | 11/2010 | El-nakhily et al. | |
| 2011/0015958 A1* | 1/2011 | April | G06Q 10/06 |
| | | | 705/321 |
| 2011/0022374 A1 | 1/2011 | Benayon et al. | |
| 2011/0060704 A1* | 3/2011 | Rubin | G06N 20/00 |
| | | | 706/12 |
| 2011/0071811 A1 | 3/2011 | Kuehr-Mclaren et al. | |
| 2011/0153685 A1 | 6/2011 | Butine | |
| 2011/0307290 A1 | 12/2011 | Rolia et al. | |
| 2012/0116850 A1* | 5/2012 | Abe | G06Q 10/067 |
| | | | 705/7.38 |
| 2012/0254092 A1* | 10/2012 | Malov | G06Q 30/0201 |
| | | | 706/52 |
| 2013/0035985 A1 | 2/2013 | Gilbert | |
| 2013/0151305 A1* | 6/2013 | Akinola | G06Q 10/067 |
| | | | 705/7.25 |
| 2013/0151315 A1 | 6/2013 | Akinola et al. | |
| 2013/0283340 A1* | 10/2013 | Biswas | G06F 21/44 |
| | | | 726/1 |
| 2014/0058712 A1* | 2/2014 | Gottemukkala | G06Q 10/0631 |
| | | | 703/6 |
| 2014/0058798 A1* | 2/2014 | Gottemukkala | G06Q 10/06 |
| | | | 705/7.37 |
| 2014/0058799 A1 | 2/2014 | Gottemukkala | |
| 2014/0330616 A1* | 11/2014 | Lyras | G06Q 10/063 |
| | | | 705/7.28 |
| 2017/0140007 A1 | 5/2017 | Agarwal et al. | |
| 2017/0140040 A1 | 5/2017 | Gottemukkala et al. | |
| 2017/0140306 A1* | 5/2017 | Prabhu | G06Q 10/067 |
| 2017/0140307 A1* | 5/2017 | Gottemukkala | G06Q 10/067 |
| 2017/0140310 A1* | 5/2017 | Gottemukkala | G06Q 10/067 |

(56) References Cited

U.S. PATENT DOCUMENTS

2017/0140319 A1 5/2017 Gottemukkala et al.
2017/0140405 A1 5/2017 Gottemukkala et al.

OTHER PUBLICATIONS

"U.S. Appl. No. 14/493,277, Final Office Action mailed Oct. 10, 2017", 30 pgs.
"U.S. Appl. No. 14/493,277, Non Final Office Action mailed Mar. 6, 2017", 28 pgs.
"U.S. Appl. No. 14/493,277, Non Final Office Action mailed Jun. 21, 2018", 39 pgs.
"U.S. Appl. No. 14/493,277, Preliminary Amendment filed Feb. 5, 2016", 3 pgs.
"U.S. Appl. No. 14/493,277, Response filed Jun. 6, 2017 to Non Final Office Action mailed Mar. 6, 2017", 12 pgs.
"U.S. Appl. No. 14/493,277 Response filed Apr. 9, 2018 to Final Office Action mailed Oct. 10, 2017.pdf", 11 pgs.
"International Application Serial No. PCT/US2013/056540, International Preliminary Report on Patentability mailed Mar. 5, 2015", 15 pgs.
"International Application Serial No. PCT/US2013/056540, International Search Report mailed Dec. 17, 2013", 3 pgs.
"International Application Serial No. PCT/US2013/056540, Written Opinion mailed Dec. 17, 2013", 13 pgs.
Agarwal, Amit, et al., "Plan Model Searching", U.S. Appl. No. 14/885,764, filed Oct. 16, 2015, 119 pgs.
Gottemukkala, Chakradhar, et al., "Global Market Modeling for Advanced Market Intelligence", U.S. Appl. No. 13/410,222, filed Mar. 1, 2012.
Gottemukkala, Chakri, et al., "Plan Modeling and Task Management", U.S. Appl. No. 14/752,774, filed Jun. 26, 2015, 82 pgs.
Gottemukkala, Chakri, et al., "Plan Modeling and User Feedback", U.S. Appl. No. 14/751,526, filed Jun. 26, 2015.
Gottemukkala, Chakri, et al., "Plan Modeling Visualization", U.S. Appl. No. 14/752,810, filed Jun. 26, 2015, 143 pgs.
Gottemukkala, Chakri, et al., "Unstructured Data Processing in Plan Modeling", U.S. Appl. No. 15/054,036, filed Feb. 25, 2016, 95 pgs.
Michael, F Schwartz, "A Scalable, Non-Hierarchical Resource Discovery Mechanism Based on Probabilistic Protocols", CU-CS-474-90, Year: 1990, (Jun. 1990).

* cited by examiner

COMPUTATIONAL UNIFIED GRAPH HIERARCHY MODEL

CROSS-REFERENCE TO RELATED APPLICATION

This application is a continuation of U.S. patent application Ser. No. 14/493,277, filed Sep. 22, 2014, which is incorporated by reference herein in its entirety.

TECHNICAL FIELD

This disclosure relates in general to the field of computer software modeling and, more particularly, to business entity modeling.

BACKGROUND

Modern enterprises are competing in global markets that are increasingly complex and dynamic. A single enterprise may have a multitude of different departments, managers, and assignments, each having their own respective objectives, plans, and goals commensurate with their respective roles within the enterprise. Additionally, a single enterprise may have one or more enterprise-wide goals that involve the collaboration and involvement of its different departments, managers, and business units. For each goal, an enterprise may develop a plan for realizing the goal. A variety of different paths may exist for reaching the goal and a plan can establish which of these paths will be followed, such as defined by the particular activities, inputs, and steps the enterprise will adopt in pursuing its goal. Because a variety of potential paths may be adopted by an enterprise to reach its goal, planning can involve determining which of the path(s) are most desirable or optimal for the particular enterprise. Additionally, planning can involve the modification or replacement of previously-adopted plans based on changed conditions within the enterprise, the market place, or geopolitical landscape in which the enterprise exists.

BRIEF DESCRIPTION OF DRAWINGS

Like reference numbers and designations in the various drawings indicate like elements.

SUMMARY

Figure 1:
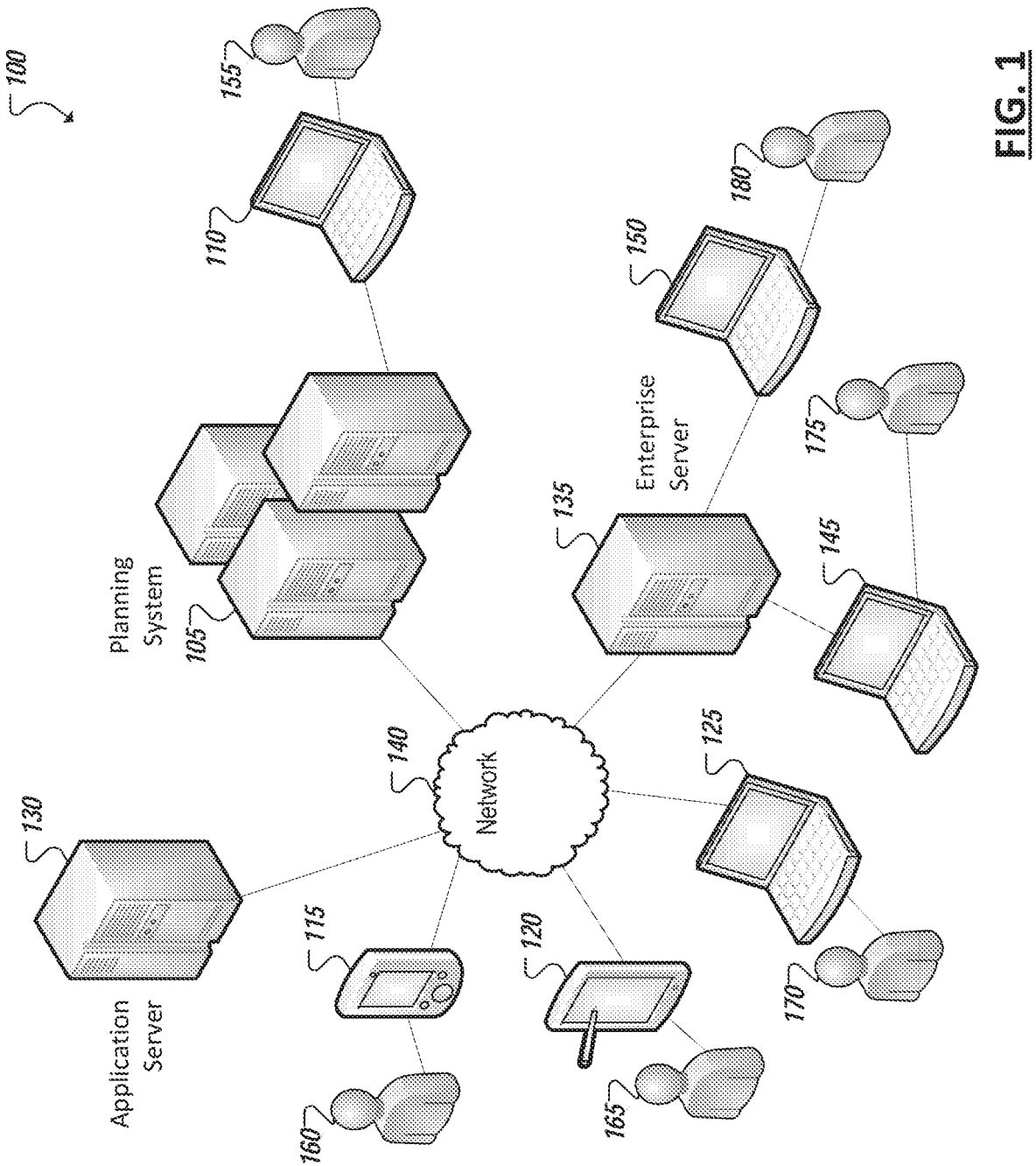
FIG. 1 is a simplified schematic diagram of an example computing system adapted to provide one or more example business models.

In one general aspect of the subject matter described in this specification can be embodied in an apparatus, a system, a machine readable storage, a machine readable medium, hardware- and/or software-based logic, and a method to identify a change to a particular measure in a particular one of a plurality of business models, identify a dependency model identifying relationships between the particular measure and one or more other measures, where the relationships include at least one hierarchical relationship and at least one non-hierarchical relationship, and modify at least a particular one of the one or more other measures based on the change and the relationships.

These and other embodiments can each optionally include one or more of the following features. The particular business model can include a plan model. The plan model can represent a respective business outcome expressed as one or more respective outcome measures and can include one or more input drivers representing variables influencing the one or more outcome measures, and a scope model defining a domain of the plan model to which the business outcome applies. The particular other measure can be in a different one of the plurality of business models. The dependency model can model a relationship between the particular business model and the different business model. The dependency model can further define relationships between two or more computational entities. Values of at least some of the measures can be based on the computational entities. The particular other measure can be modified based on at least one of the computational entities. Values of at least some measures can be provided by input values. The input values can include at least one of a source value from a source and a user-provided value.

One or more of the following features can also be included. The change can be made in association with scenario modeling. The change can include an input value for the measure and a scenario can be generated from the particular business model for a particular domain based on the input value. The value can be a value of an input driver, the particular other measure can correspond to an outcome measure, and generating the scenario can include generating a value of the outcome measure based on the value of the input driver and the relationships. The value of the input driver can include a hypothetical value for the input driver.

A graphical representation of the scenario can be presented on a user interface of a display device. The generated scenario can include a first version of a particular scenario and the graphical representation can include a comparison of the first version of the particular scenario with one or more other versions of the particular scenario. Each model can model a respective business entity. The dependency model can model relationships between the plurality of models. Each model can define one or more domains, one or more attributes of each domain, one or more of the measures, and one or more computational entities.

In another general aspect, a computer program product, encoded on a non-transitory, machine readable storage medium, can include a plurality of business models and at least one dependency model. The business models can model respective business entities and include one or more measures. The dependency model can identify relationships between the one or more measures, and the relationships can include at least one hierarchical relationship and at least one non-hierarchical relationship, and changes to a particular one of the measures can be propagated to one or more other measures based on one or more of the relationships.

These and other embodiments can each optionally include one or more of the following features. The plurality of business models can include a network of plan models, and each plan model can model one or more respective business outcomes. The network of plan models can include a network of plan models for a plurality of business units within a particular organization.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

DETAILED DESCRIPTION

Modern enterprises can often include complex organizations, such as large multinational corporations with multiple business units and departments operating in multiple different countries, as well as organizations competing in multiple different marketplaces, including multiple product markets and geographical markets, among other examples. Organization can also include stock and commodity markets and exchanges, non-profit organizations, charities, religious organization, educational institutions, joint-ventures, market segments, trade associations, and so on. Such organizations can adopt a variety of goals and plans in connection with their respective operation, including for-profit and not-for-profit goals. Planning and decision-making activities in connection with these goals has become increasingly complex. For instance, such goals can be set at various levels within the organization, including at the organization level (i.e., goals that apply to the entire organization) as well as at various sub-levels, such as the business unit sub-level, the department sub-level, the region sub-level, the office sub-level, etc. Sub-level goals may be limited in their scope to their respective sub-part of the organization and may only concern a subset of people within the organization. Further, some goals may be limited temporally, such as goals that apply to a certain period (such as a financial year or quarter). Regardless of the level or type of goal, plans can be adopted by the organization (or a portion of the organization) for accomplishing these goals. In some instances, plans and goals of different sub-parts of an organization can conflict and the amount of time needed to communicate and synchronize plans and goals can prevent adequate collaboration and coordination within the organization. Further, a plan may involve setting targets for a variety of inputs relating to a variety of different business entities. The inputs may include values quantifying or defining attributes of the respective business entities relevant to the goal and plan. Such business entities can include such entities as product categories, distribution channels, supply channels, customers, products, fiscal calendar terms, geographic regions and sub-regions, etc.

Software-based models and systems can be developed that model plans, goals, and outcomes within an organization as well as the business entities involved in these plans, goals, and outcomes. Such models can be accessed and used by systems and users to assist in improving an organization's (or group of organizations') planning activities, as well as the realization of the goals associated with its planning activities. A set of models can be provided, each model corresponding to a defined domain relevant to an organization and modeling aspects of that domain as well as the inputs and outcomes relevant to achieving or analyzing goals of the specified domain. Such models can be used to enable interactive, quick, collaborative decision-making within an organization, including along particular user or department roles and functions. Models can both model the various business entities involved in the plans and activities of an organization as well as model the relationships between these business entities. Additionally, models can model the plans of the organization as well as the interconnectedness of some plans and goals of an organization. Accordingly, such plan models can be used to coordinate the efforts of various portions of an organization directed to different goals to optimize the activities of an organization. Additionally, scenario planning can be carried out using such plan models, with business scenarios of the organization being modeled and compared based on the plan models. Additionally, plan models and business scenarios based on plan models can provide decision-makers of an organization with views into the business entities and attributes relevant to the organization's goals, including views at various levels of abstraction and detail. In general, such plan model and business scenarios can be used to guide the direction of real-world departments and business of an organization, whether for-profit or not-for-profit, to assist in the achieving of the organization's (or multiple organizations') varied goals.

Accordingly, a general software framework can support modeling business entities and relationships among them. The modeled relationships can include both hierarchical and non-hierarchical relationships and dependencies. Based on this capability, the framework can be used for modeling a large number of business entities and business workflows to give business users complete visibility into modeled aspects of the business workflow and scenarios. Further, it also gives the users the ability to develop alternative solutions to any business problems or opportunities and evaluate the efficacy of those solutions. Business workflows can be modeled including integrated business planning, sales and operations planning, supply chain planning, consensus demand planning, assortment planning, promotions planning, among other examples.

FIG. 1 is a simplified block diagram illustrating an example implementation of a computing system 100 including a planning system 105 capable of generating, maintaining, and serving a plurality of business models to potentially several different clients for use in planning and other business activities. Additionally, a planning system 105 can further include programs, tools, and functionality allowing clients to access and interact with business models, including the editing, building, and linking of business models (including plan models), scenario building using these models, among other functionality and tools, including those discussed explicitly or implicitly herein. Client computing devices can include endpoint user devices (e.g., 110, 115, 120, 125, 145, 150) that can include display devices and user interfaces allowing users (e.g., 155, 160, 165, 170, 175, 180) to interact with planning system 105, business models hosted or provided by the planning system 105, and applications, programs, and services hosted or provided by the planning system that allow users to interact with, edit, build, generate and compare business models as well as generate, modify, and analyze scenarios and business plans based on the models. In some instances, client computing devices can include endpoint devices (e.g., 110) local to the planning system 105 allowing administrators, model developers, and other users (e.g., 155) to develop and maintain business models and planning tools hosted or provided by the planning system 105. Endpoint devices can also include computing devices remote from at least a portion of the planning system 105 and accessing planning system resources, such as model interaction tools and business models, from the planning system 105 over one or more networks (e.g., 140). In some implementations all or a portion of the planning system 105 can be distributed to or implemented on clients (e.g., 110, 115, 120, 125, 145, 150), such as client-specific plan models and other business models, software tools for use by clients in interacting with and using the models, etc.

In addition to endpoint devices, other systems can also act as clients of planning system 105. For instance, application servers (e.g., 130) hosting one or more applications, services, and other software-based resources can access and use business models and functionality of planning system 105 in connection with the applications and services hosted by the application server (e.g., 130). Enterprise computing systems (e.g., 135) can also interface with and use business models and services of an example planning system 105. For instance, enterprise-specific models can be developed and used by endpoint devices (e.g., 145, 150) within the enterprise. In some instances, other enterprise tools and software can be provided through enterprise computing system 135 and consume data provided through business models and model-related services of the plan model system 105, among other examples.

In general, "servers," "clients," and "computing devices," including computing devices in example system 100 (e.g., 105, 110, 115, 120, 125, 130, 135, 145, 150, etc.), can include electronic computing devices operable to receive, transmit, process, store, or manage data and information associated with computing system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 130, 135, 145, 150, etc.) can each include one or more processors, computer-readable memory, and one or more interfaces, among other features and hardware. Servers can include any suitable software component or module, or computing device(s) capable of hosting and/or serving software applications and services (e.g., business models and modeling tools and services of the planning system 105, applications and services of application server 130, applications and services of enterprise system 135, etc.), including distributed, enterprise, or cloud-based software applications, data, and services. For instance, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User or endpoint computing devices (e.g., 105, 110, 115, 120, 125, 145, 150, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 140). Attributes of user computing devices, and computing device generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices (e.g., 105, 110, 115, 120, 125, 145, 150, etc.) can further include at least one graphical display device and user interfaces allowing a user to view and interact with graphical user interfaces of applications and other programs provided in system 100, including user interfaces and graphical representations of programs interacting with plan models and plan-model-related tools and service provided, for example, by a plan model system 105. Moreover, while user computing devices may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
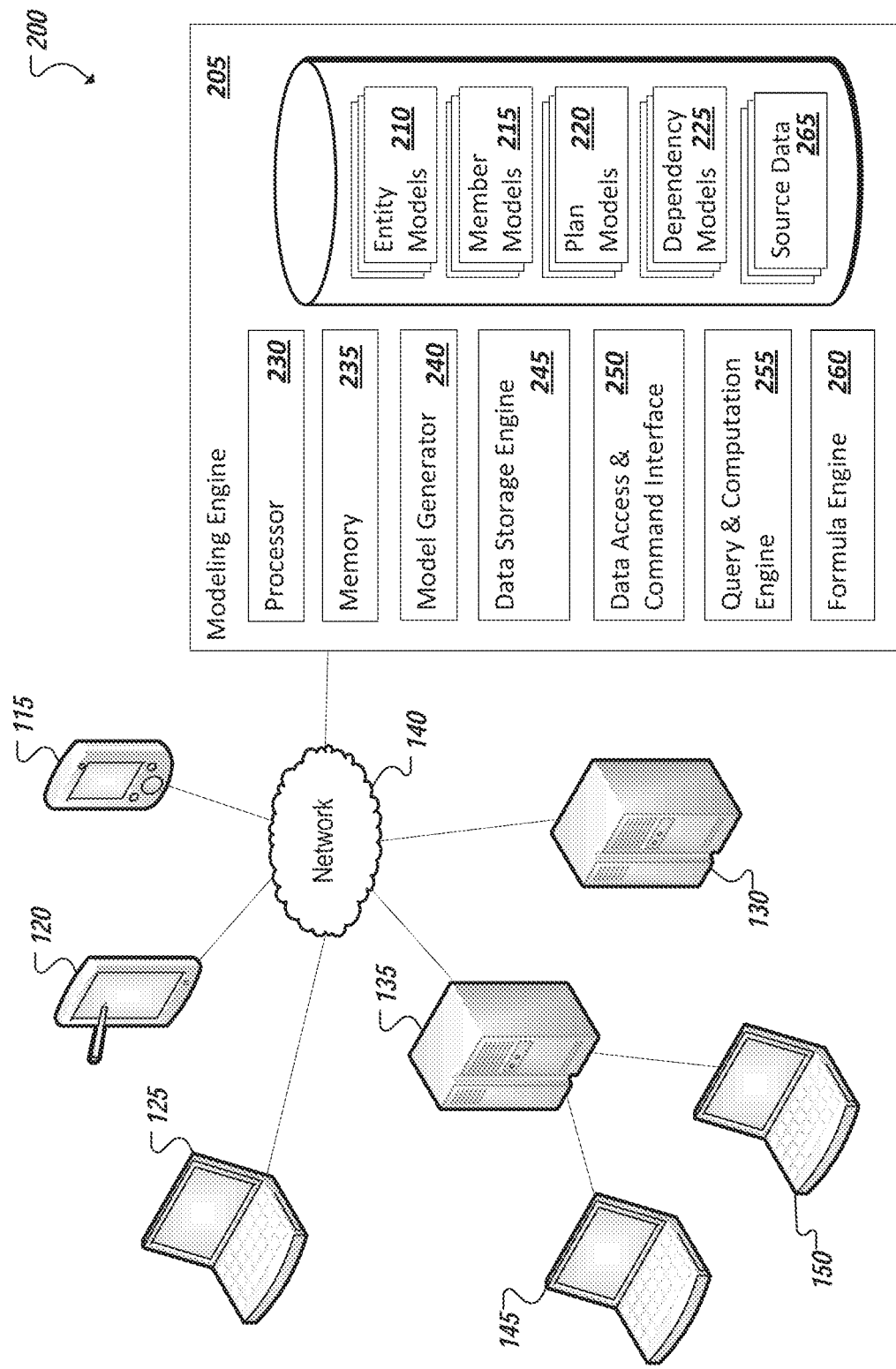
FIG. 2 is a simplified block diagram of an example system including an example modeling engine.

Turning to FIG. 2, a simplified block diagram is shown of an example system 200 including an example modeling engine 205. In some instances, modeling engine 205 can be hosted by and implemented in connection with a planning system, such as the planning system 105 described in the example of FIG. 1. In other examples, instances of a modeling engine 205 (including multiple distinct instances) can be hosted on enterprise computing platforms and other computing environments accessing and otherwise making use of business models (e.g., 210, 215, 220, 225). A modeling engine 205 can host, serve, maintain, access, or otherwise provide models, including models to model various business entities (e.g., 210), sub-entities (or members) (e.g., 215), relationships between the business entities and models (e.g., dependency 225), and potential business outcomes or plans (e.g., plan models 220) of a particular organization or plurality of organizations. A modeling engine 205 can additionally include functionality for using, building, and editing such models. Moreover, the example system 200 of FIG. 2 can further include one or more additional computing devices, systems, and software-based tools (e.g., embodied on devices 115, 120, 125, 130, 135, 145, 150) communicating with modeling engine 205, for instance, over one or more networks (e.g., 140).

In one example implementation, a modeling engine 205 can include one or more processors (e.g., 230) and memory elements (e.g., 235), as well as one or more software- and/or hardware-implemented components and tools embodying functionality of the modeling engine 205. In some examples, a modeling engine 205 can include, for instance, such components and functionality as a model generator 240, data storage engine 245, data access and command interface 250, query and computation engine 255, and formula engine 260, among potentially other components, modules, and functionality, including combinations of functionality and tools described herein. In addition, in some implementations, a modeling engine 205 can include business models (e.g., 210, 215, 220, 225) either hosted local to the modeling engine 205 or accessed from remote model servers or other data stores. Functionality of modeling engine 205 can access, utilize, and consume business models of the modeling engine 205 as well as potentially models of other systems or modeling engines (e.g., an instance of a modeling engine belonging to another enterprise distinct from the enterprise or host of modeling engine 205), among other examples.

In some implementations, an example model generator 240 can be included possessing functionality for creating or editing business models. In some instances, a model can be generated by instantiating an instance of a preexisting model type, model template, or class, among other examples. Further, in some implementations, user interfaces and controls can be provided in connection with an example model generator 240 allowing human or automated users to input data to populate, define, and be otherwise used in an instantiation of a model. In some instances, source data (e.g., 265) can also be collected, requested, retrieved, or otherwise accessed to populate attribute fields, build logic of a model, and be otherwise used (e.g., by model generator 240) to generate an instantiation of a particular business model to add to a set of models.

A data storage engine (e.g., 245) can be provided for storing and managing a variety of models and other data. Models managed by the data storage engine 245 can include models (e.g., entity models 210 and member models 215) to model business entities such as products, product brands, product categories, competitor products, facilities, market share drivers, inventory nodes, among several other examples. Other models managed by data storage engine 245 can include dependency models 225 to model both hierarchical relationships and non-hierarchical relationships among business entities, relationship between the corresponding models (e.g., 210, 215), as well as relationships between plans and objectives of an organization and the corresponding plan models 220, among other examples. Data storage engine 245 can store and manage measures and measure (fact) data for applicable sets of business entities models, meta data for describing and processing entities, relationships, and fact data (such as computation rules, procedures, scripts) included in the business models, among other data. Data elements can include, for examples, data elements describing domains (e.g., product domain, organization domain, etc.), attributes (e.g., products, product brands, product categories, etc.), hierarchies (e.g., Product->Brand->Category), non-hierarchical relationships (e.g., Competitor: Product=>Competitor Product), submitted and computed measures (e.g., gross or net sales for a particular market segment), facts (or measure data) (e.g., the actual values of gross sales, net sales, and other measures), and meta data (e.g., active rules, measure calculations, model logic, procedures, etc.), among other examples. Data managed by data storage engine 245 can be stored in-memory, on-disk, or through a combination. The data storage engine 245 can support a set of data operators allowed to access or modify the data, in some cases providing multi-user transaction support for data access, among other example functionality and features.

Data storage engine 245 can, in some examples, also provide the ability to create and manage multiple independent scenarios for the data. Particular instances of a model or a particular set of attribute values of a model can be adopted by an organization as a plan model (e.g., 220) of a current working plan, goal, assumption, or approach to be considered by the organization both in its analysis of other business scenarios as well as drive the real world behavior and decision-making of the organization. Various versions of one or more of the plan models 220 can be managed using an example data storage engine 245 and modeled scenarios can be generated based on the plan models 220. For example, a particular modeled scenario can be generated and designated as a current working model, adopted business plan, etc. of an organization, and serve as a guide to the organization's decision makers and employees. Such scenarios can model hypothetical business scenarios based on particular or varying input drivers (e.g., modeling real world business-related inputs affecting a particular business goal or outcome), as well as based on particular goals (e.g., modeling hypothetical conditions that could result in a particular outcome) modeled in a plan model 220.

In some implementations, a data access and command interface 250 can be provided that defines access to entities, relationships, and fact data and provides seamless traversal across related entities (for potentially multiple different types of relationships). The data access and command interface 250 can further provide the capability to add/modify/delete entities, fact data, and the relationships among them, as well as provide various commands to manage the state of the data. In some cases, a data access and command interface 250 can be instantiated with a specialized or other data access language, such as a language optimized for querying and computations, such as the integrated business planning language (IBPL), among other potential examples.

A query and computation engine 255 can also be provided to interpret commands and queries of the business models (e.g., 210, 220), such as commands and queries of a planning language. The query and computation engine 255 can execute each valid command/query to either fetch data from data and models of the data storage engine 245 or to effect changes to the models and data in the data storage engine 245. In some implementations, a query and computation engine 255 can provide executable implementations for the elements of the interface language (of the data access and command interface 250). For instance, the query and computation engine 255 can use the data storage engine operators to access/modify data, implement the query dialect for fetching data, and implement update commands for modifying data, as well as other commands.

A modeling engine 205 can further include a formula engine 260 that can maintain one or more dependency models 225 to represent the relationships among models and their measures based on active rules for dependent measure computations. A dependency model 225 can model the collective hierarchical, non-hierarchical, and other computational dependencies between measures of one or more models. Further, the formula engine 260 can trigger an incremental plan in response to any external change to data in data storage engine 245 such that the change propagates across the models based on the change. The formula engine 260 can traverse a dependency model 225 to identify the set of measures and the computational rules that are directly or indirectly dependent on the input data change and execute the set of computational rules over the relevant set of entities in the order of dependency as defined by the dependency model 225. In other words, the formula engine 260 can use a dependency model to recursively evaluate all computed measures and in the proper sequence. This can result in the re-computation and update of all measure data elements (potentially across multiple models) that are directly or indirectly dependent on the changes to input data.

Figure 3A:
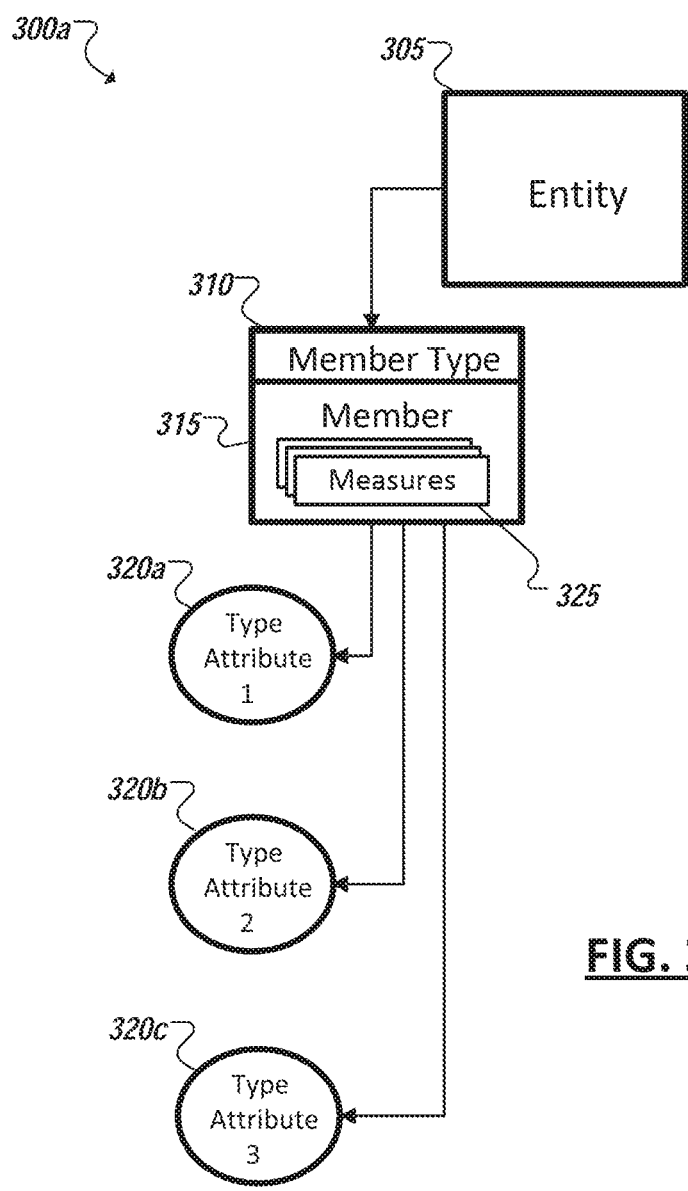
FIGS. 3A-3B are simplified block diagrams representing example models of example business entities.

Turning to FIG. 3A, a representation 300a is shown of a simplified business entity model. For instance, a model can model a business domain, such as one associated with a particular business entity (e.g., 305), the member types of the entity 310, the members of the entity 315, the attributes of the members 320a-c, and the respective measures 315 of the members. It should be appreciated that the examples herein are simplified examples. For instance, while measures may be specific to a single member type, in other instances, measures can be defined for combinations of member types over multiple domains (e.g., a Quarterly Revenue measure defined for a combination of a Product member type and a Quarter member type, etc.). Accordingly, in some instances, measures can be defined as part of a plan model (i.e., rather than within a specific, single member type model).

In some instances, separate member models may be provided that additionally (or alternatively) model each respective member instance (e.g., 315), including the measures 315 of the model. In the example of FIG. 3A, a member type can be one of a plurality of member types of an entity 305 and each member type (e.g., 310) can include one or more instances, or members (e.g., 315), of that particular member type (e.g., 310). The member type (e.g., 310) can define a set of member type attributes (e.g., 320a-c) relevant to members of that type and that can define members of that type. Indeed, each member (and member model) of a particular member type can inherit the member type attributes of the corresponding member type. For instance, if the product being modeled is a television, the attributes can include screen size, refresh rate, technology, etc. Measures can be defined and can be determined, either from source or user data (i.e., specified measures), or from a computation (involving other source or user data) (i.e., computed measures), for each member instance. Measures for a particular member type 310 or for the entity 305 can also be determined from an aggregation of the measures of the component member instances 315. Measures can be defined in corresponding member, member type, or entity models and include, as examples, gross revenue, net revenue, net cost, profit, market share, market size, among potentially limitless other example business or organizational metrics. Some of these measures (e.g., driver measures) can be derived from values discovered in source data. Other measures can be automatically derived in that they are computed values in that they are calculated from defined computations. These computations can also be defined within the model. A dependency model can model not only the relationships between domains, attributes, and measures, including both hierarchical and non-hierarchical relationship, but the dependency model can also model relationships between the defined computations. For instance, computational dependencies between measures may be modeled by virtue of the hierarchical relationship among the related modeling entities, computational dependencies between measures may be modeled by virtue of non-hierarchical relationship among the related modeling entities, computational dependencies between measures may also be specified by explicit computations among measures, among other examples.

Figure 3B:
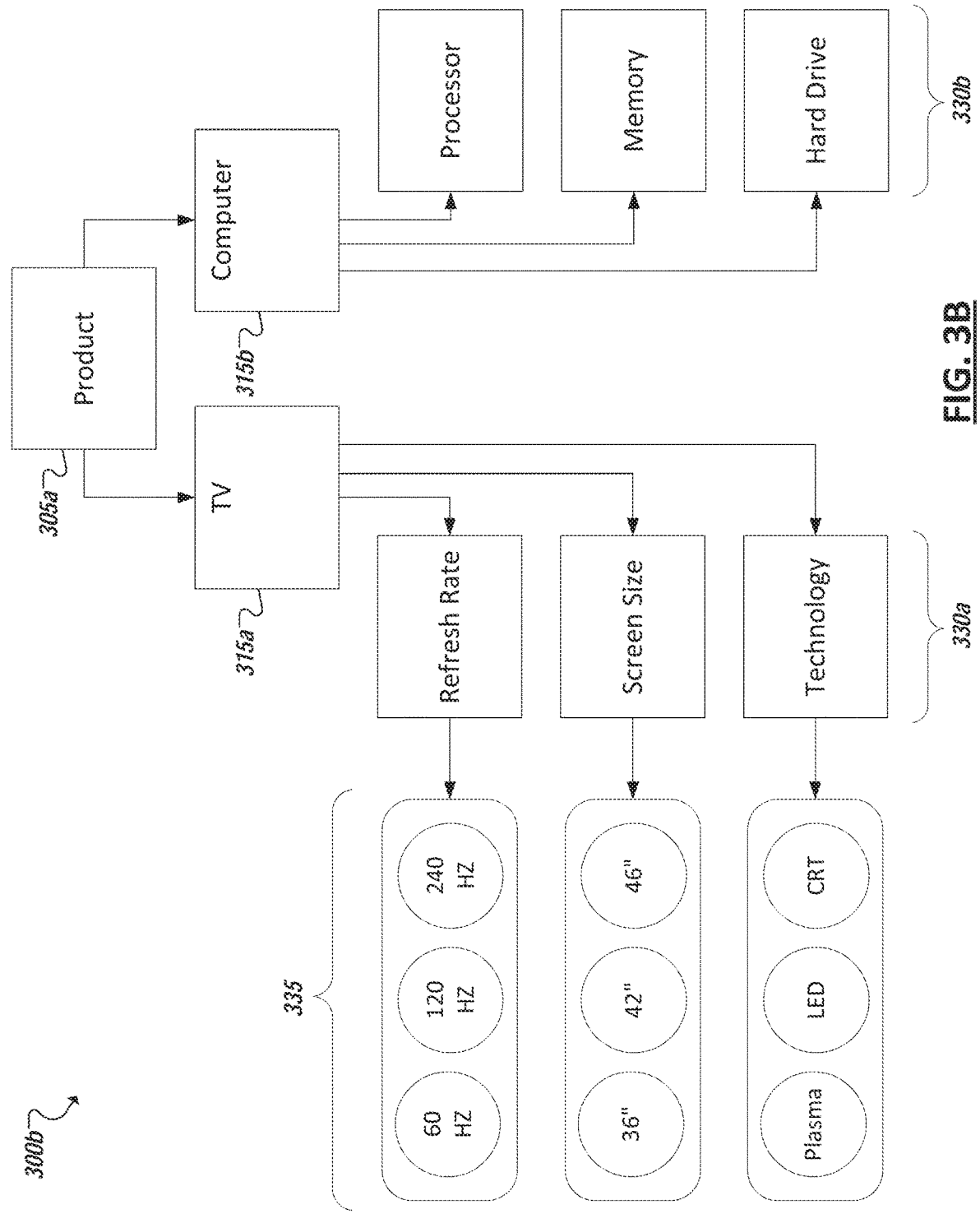

In the example representation 300b of FIG. 3B, an example entity 305a is illustrated corresponding to the products offered by a particular business organization. Within the global marketplace a wide variety of different products may exist from smartphones, printers, and digital video recorders to cardboard packaging, breakfast cereal, and tissue papers, among scores of other examples. Further, in the example of product business entities, various products may have relevance to different organizations and different goals within the same organization. Accordingly, plan models can include product business entities within their domains for different reasons in modeling particular outcomes, including domains corresponding to particular products of a particular business unit of an organization, corresponding to competitor products, corresponding to marketing budgets, inventory, etc.

In the particular example 300b of FIG. 3B, a domain can be defined, at least in part, through the definition of product offerings that include two particular member types within the product business entity 305a, in this example, a televisions member type (315a) and computer member type (315b). Each of the member types 315a, 315b can respectively define a set of member-type attributes (e.g., 330a, 330b) describing features and details generally relevant to members of that type. For example, a television member type 315a can include member type attributes such as the refresh rate, screen size, and technology (e.g., LED, LCD, plasma, etc.) of a particular television (i.e., member of the television member type), including other potential television-related attributes. Similarly, a computer member type 315b, while a member type of the same business entity (e.g., Product), can have a different set of attributes corresponding to features and specifications of computers, such as processor type, processor speed, memory, hard drive, etc.

Each member of a member type can be defined, at least in part, according to attribute values defined for the member. For instance, a variety of different attribute values (e.g., 335) may exist among a set of members. For example, a first television member considered in the domain may be a 120 Hz 42" LCD television, while a second television member in the domain is a 240 Hz 46" plasma model. Corresponding measures can be determined and defined in a model (or sub-model) modeling each member instance. Additionally, in some examples, multiple members in a member type can share one or more attribute values. Shared member type attributes can serve as the basis for member groups. For instance, a group of members of the example television member type of FIG. 3B can be defined based on screen size, with a group of televisions being defined for 36" televisions, 42" televisions, 46" televisions, and so on.

Figure 4:
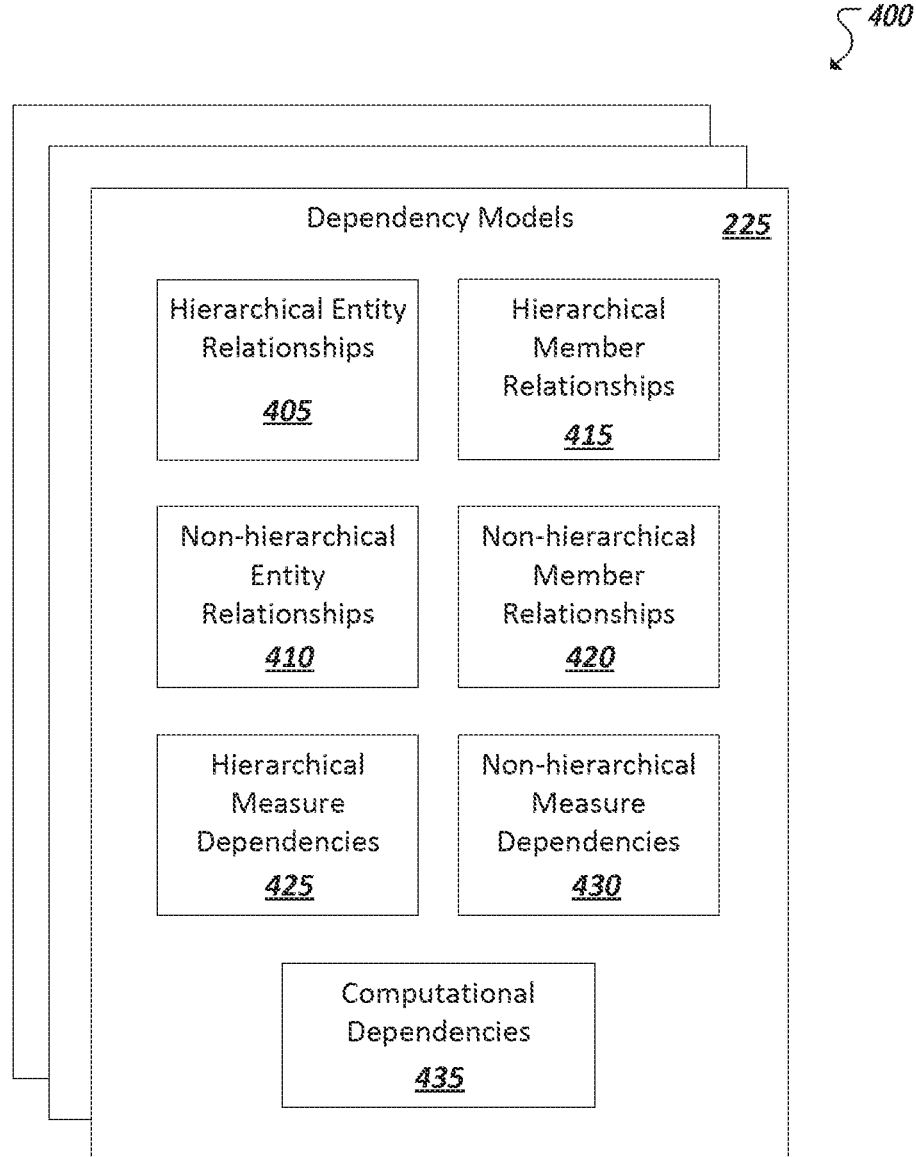
FIG. 4 is a simplified block diagram illustrating principles of example dependency models.

FIG. 4 shows a representation 400 of example dependency models 225. A dependency model 225 can model hierarchical and non-hierarchical relationships among business entities, their models and data in a single integrated instance. In some instances, a single instance of a dependency model 225 can be defined for an organization and the set of models modeling business entities of interest to the organization. Distinct dependency models 225 can be defined for each set of models (e.g., corresponding to a respective one of a number of customer organizations consuming the business models). In other implementations, multiple dependency models can be provided for a single set of models, with the collection of multiple dependency models modeling the entirety of the hierarchical and non-hierarchical relationships and dependencies between models and measures of the set of models, among other examples. Further, an integrated planning response mechanism can be provided (e.g., through a modeling engine) based on computational dependencies defined in the dependency models across all the models and relationships. Thus, an integrated language interface can be provided to support modeling, computational, and query retrieval aspects of all entities and data based on the comprehensive relationships modeled through the dependency models 225.

The representation 400 of FIG. 4 shows the relationships and dependencies that can be modeled in a dependency model 225. For instance, a dependency model can model both the hierarchical and non-hierarchical relationships between business entities (e.g., 405, 410), the hierarchical and non-hierarchical relationships between members of the entities (e.g., 415, 420), hierarchical and non-hierarchical dependencies between measures (of the members and entities) (e.g., 425, 430), and dependencies between computational entities (e.g., 435) used to compute one or more of the measures. This collection of relationships and dependencies (e.g., 405, 410, 415, 420, 425, 430, 435) can model the expansive interrelationships within an organization and the business entities of interest to the organization (including business entities within and external to the organization). The dependency model 225 can be utilized by a formula engine to determine how changes, such as updates to a measure value or computational formula, propagate across the measures and models representing these business entities, as well as business planning activities relating to these business entities.

As noted, a dependency model can model relationships and dependencies within a set of business models. Such relationships can include hierarchical relationships between entities, member types, and members and these relationships can be extended to corresponding models and measures. For instance, the example of FIG. 5A includes a representation 500a of a business entity 502 corresponding to all products currently offered by a particular company (e.g., Company A). A hierarchical relationship can exist between the All Products entity and two groupings of the products embodied as a Cereals member type 504 and a Snack member type 506. For instance, the products of the company can be divided into two product categories: cereal and snacks. Within the cereal product category 504 the company can offer a Corn Flakes product 508, a Choko Puffs product 510, a Raisin Bran 512 product, and a Cinnamon Chips product 514. The products 508, 510, 512, 514 can be hierarchically related to the product category 504 in that each product is a child of a single parent product category. Each product 508, 510, 512, 514 can be modeled by a corresponding member model that includes measure values (e.g., 522, 524, 526, 528) for the respective product corresponding to the measures for each product member instance, such as market share, revenue, marketing spend, cost, among potentially many other example measures. Each (sub-)member type (e.g., product) within the Cereal and Snack member types can have the same set of measures, with each product having respective values for the set of measures (e.g., each can have values for market share, revenue, etc.). As noted herein, measures can be tied to a combination of entities (e.g., Product and Month (e.g., for Monthly Cost)). Similarly, the snacks product category 506 can include member products hierarchically related to the product category, including Tater Chips 516, Corn Crispies 518, and Granola Bar 520. Corresponding models can include measures 530, 532, 534 describing the products 516, 518, 520.

Figure 5A:
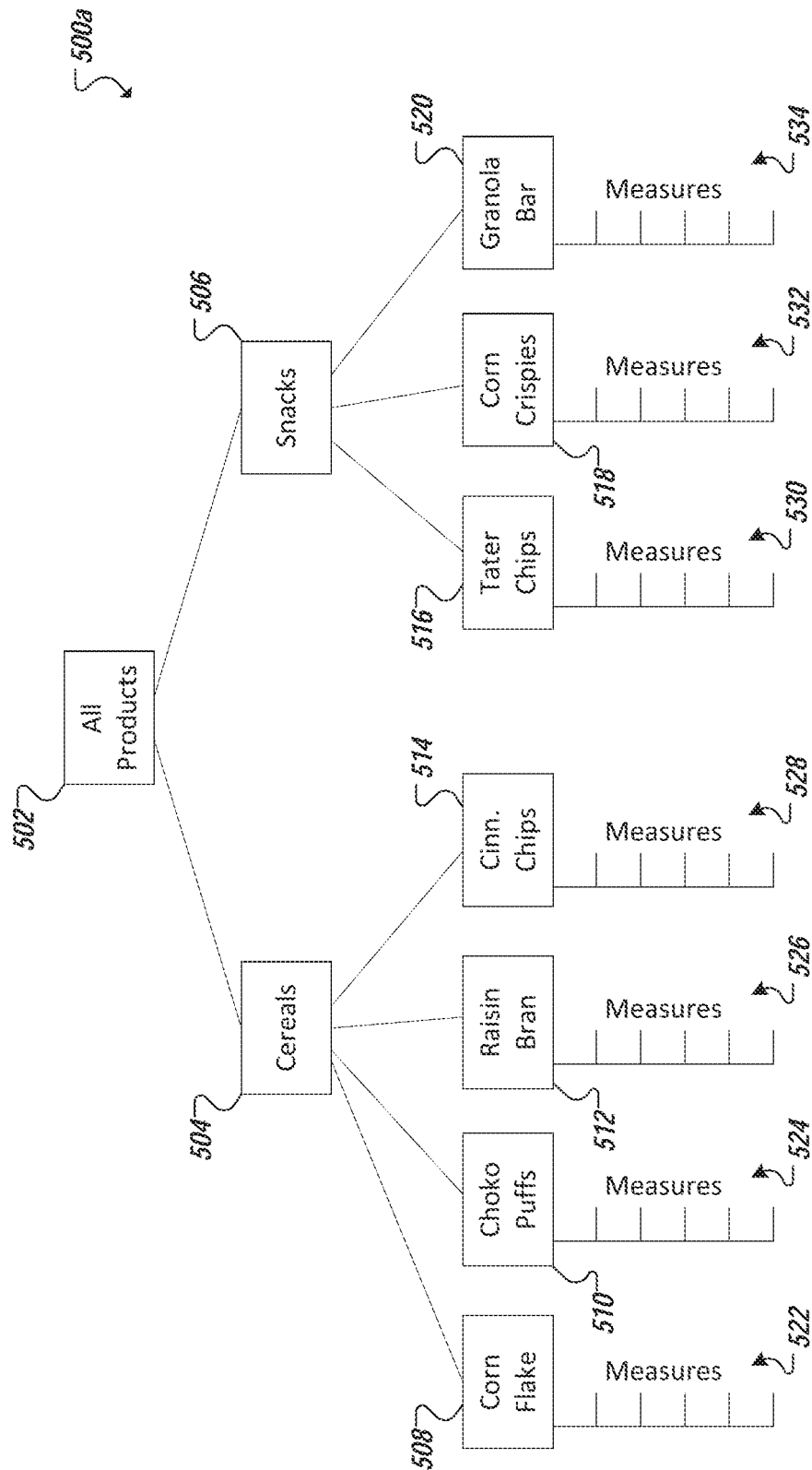
FIGS. 5A-5C are simplified block diagrams representing example relationships modeled in example dependency models.
Figure 5B:
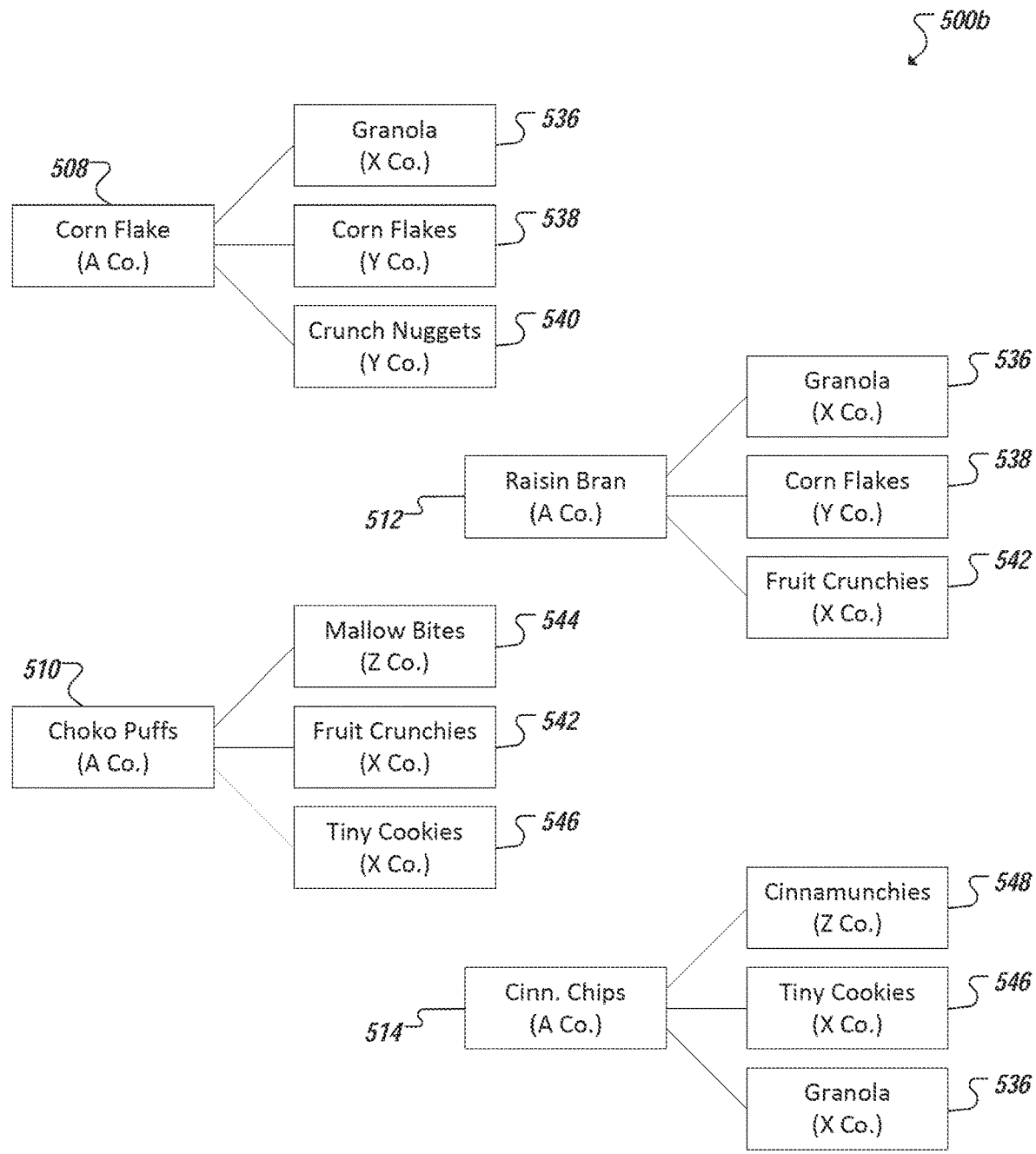

Dependency models can further model non-hierarchical relationships between business entities in addition to hierarchical relationships (such as those illustrated in the example of FIG. 5A). For instance, as illustrated in the simplified representation 500b of FIG. 5B, business models can model which competitor products compete against products of a company (e.g., the products of Company A illustrated in the example of FIG. 5A). For instance, FIG. 5B illustrates, for each of the cereal product category products (e.g., 508, 510, 512, 514), the respective competitor products (e.g., 536, 538, 540, 542, 544, 546, 548) of the product. The competitor products can also be modeled in respective business models and competitor product relationships can be modeled in the dependency model. For instance, the Fruit Crunchies product 542 of competitor Company X, the Mallow Bites product 544 of competitor Company Z, and the Tiny Cookies product 546 of Company X can be identified as competitor products of the Choko Puffs product 510. The dependency model can model these relationships as well as relationships between corresponding business models. The relationships (e.g., between product 510 and competitor products 542, 544, 546) can be non-hierarchical, in that there is not a one-to-one parent-child relationships. For instance, both product 510 and product 514 each share competitor product 546. Other examples of non-hierarchical relationships within a set of models can also be modeled through dependency models.

In addition to modeling relationships between business entities (and corresponding business models), a dependency model can also model dependencies between measures in the models. Further, as some measures can be computed measures, computed from computation rules and formulas (embodied in calculation entities), a dependency model can further model dependencies between computation entities. For instance, in the simplified representation 500c of FIG. 5C, hierarchical and non-hierarchical relationships between measures can be defined. For instance, a portion of dependencies within one or more models of data measures within the models can be defined (e.g., at 550). For instance, in the specific example of FIG. 5C, dependencies between a set of input measures are defined. For instance, the various specified data measures can include:

(M1) ProductRetailRevenue: Revenue for a given product through retail stores;

(M2) ProductInternetRevenue: Revenue for a given product over the internet;

(M3) ProdDevelopCost: Development cost for a given product;

(M4) ProdMfgCost: Manufacturing cost for a given product;

(M5) ProdMarketingCost: Marketing cost for a given product;

(M6) CompetitorProdRevenue: Revenue for a given competitor product.

Further, the following computed measures can be defined:

(M7) ProductRevenue: Total revenue for a given product, computed according to a formula: ProductRevenue=ProductRetailRevenue+ProductInternetRevenue (or computation (C1): M7=M1+M2);

(M8) ProductCost: Total cost for a given product, computed by: ProductCost=ProdDevelopCost+ProdMfgCost+ProdMarketingCost (or (C2): M8=M3+M4+M5);

(M9) TotalProfit: Total profit over all the products, computed according to: TotalProfit=sum(ProductRevenue)−sum(ProductCost) (or (C3): M9=sum(M7)−sum(M8));

(M10) CompetitorRevenue: Revenue of the competitor product for a given product ("own_product") of an organization, computed according to CompetitorRevenue(own_product)=CompetitorProdRevenue (for competitor product connected to own_product via a "Competitors" graph (non-hierarchical) relationship defined in a dependency model) (or (C4): M10=graph_function(M6));

(M11) TotalMarketShare" Percentage market share based on revenue, computed according to: TotalMarketShare=sum(ProductRevenue)*100/(sum(ProductRevenue)+sum(CompetitorRevenue)) (or (C5): M11=sum(M7)*100/(sum(M7)+sum(M10))).

Figure 5C:
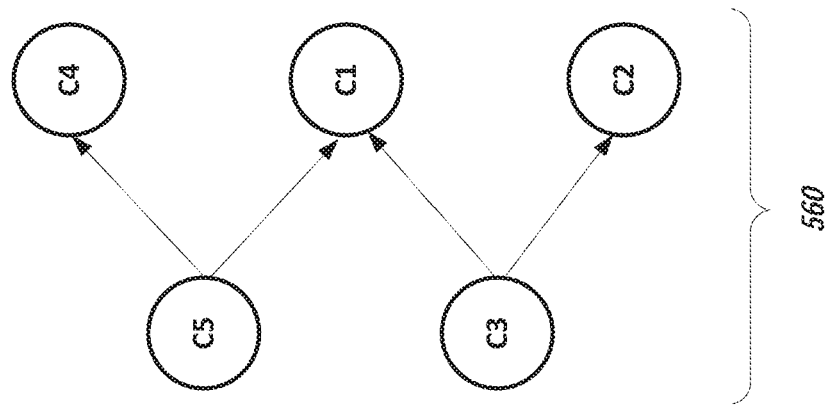
Figure 5C:
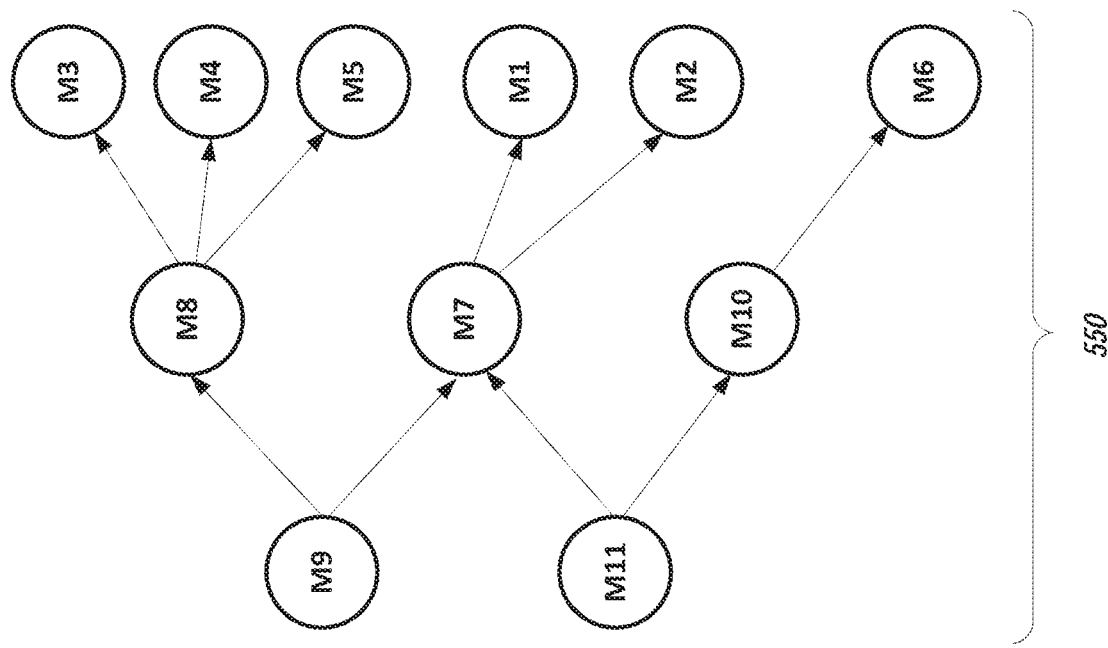

The diagram of FIG. 5C illustrates dependencies (e.g., at 550) between the measures M1-M11, as well as dependencies between computational entities C1-C5 (e.g., at 560) as defined in an example dependency model. A dependency model can provide the static information necessary to determine the set of affected computed measures for any given change to an input measure. For example, if the user changes ProdMarketingCost (M5), the dependency model 225 can be read to determine that measures ProductCost (M8) and TotalProfit (M9) are also to be recomputed accordingly, that is, by executing the computations (C2) and (C3). On the other hand, if the user updates ProductRetailRevenue (M1), the dependency model (e.g., 225) can be read to determine that measures ProductRevenue (M7), TotalProfit (M9), and TotalMarketShare (M11) are affected by the change and are to be recomputed (e.g., through the execution of computations (C1), (C3), and (C5)).

A formula engine can access the dependency models corresponding to one or more particular models and make use of the dependency model and use information from both the static dependency model and dynamic scope data (e.g., data identifying the models in which the affected measures are included) to determine the exact set of computations that should be executed (e.g., to propagate a change in one measure of a model), as well as determine the smallest feasible scope of data (e.g., as defined in a scope model) for which the computations should be executed (e.g., based on a change). For instance, the scope of input changes can constrain the scope model of computations such that only the subset of dependent measure computations is executed. Not only can the dependency model determine the set of computations that should be executed to appropriately propagate a change across a set of measures in a model, but the dependency model can also be processed to determine the order in which these computations are to be executed. For instance, computations C1 and C2 are to be executed prior to the execution of C3, and computations C1 and C4 are to be executed before executing computation C5, among other examples. Accordingly, starting from the user-modified measures, formula engine successively processes each dependent measure and executes the related computations for the appropriate scope to propagate the user-modified change(s) across the measures of the model.

It should be appreciated that the examples of FIGS. 5A-5C are provided merely as non-limiting, illustrative examples to illustrate certain principles that may be applied to dependency models. As noted above, dependency models can model a set of various relationships and dependencies such that changes to measures within a model are propagated automatically by following the dependency model. Such dependency models can model dependencies between the measures and computations of a model where the dependencies could be the result of both hierarchical and nonhierarchical relationships among entities or explicitly specified computations. Further such computational dependencies can be across different plan models (e.g., as a single measure can apply to multiple different models of different business entities).

Figure 6A:
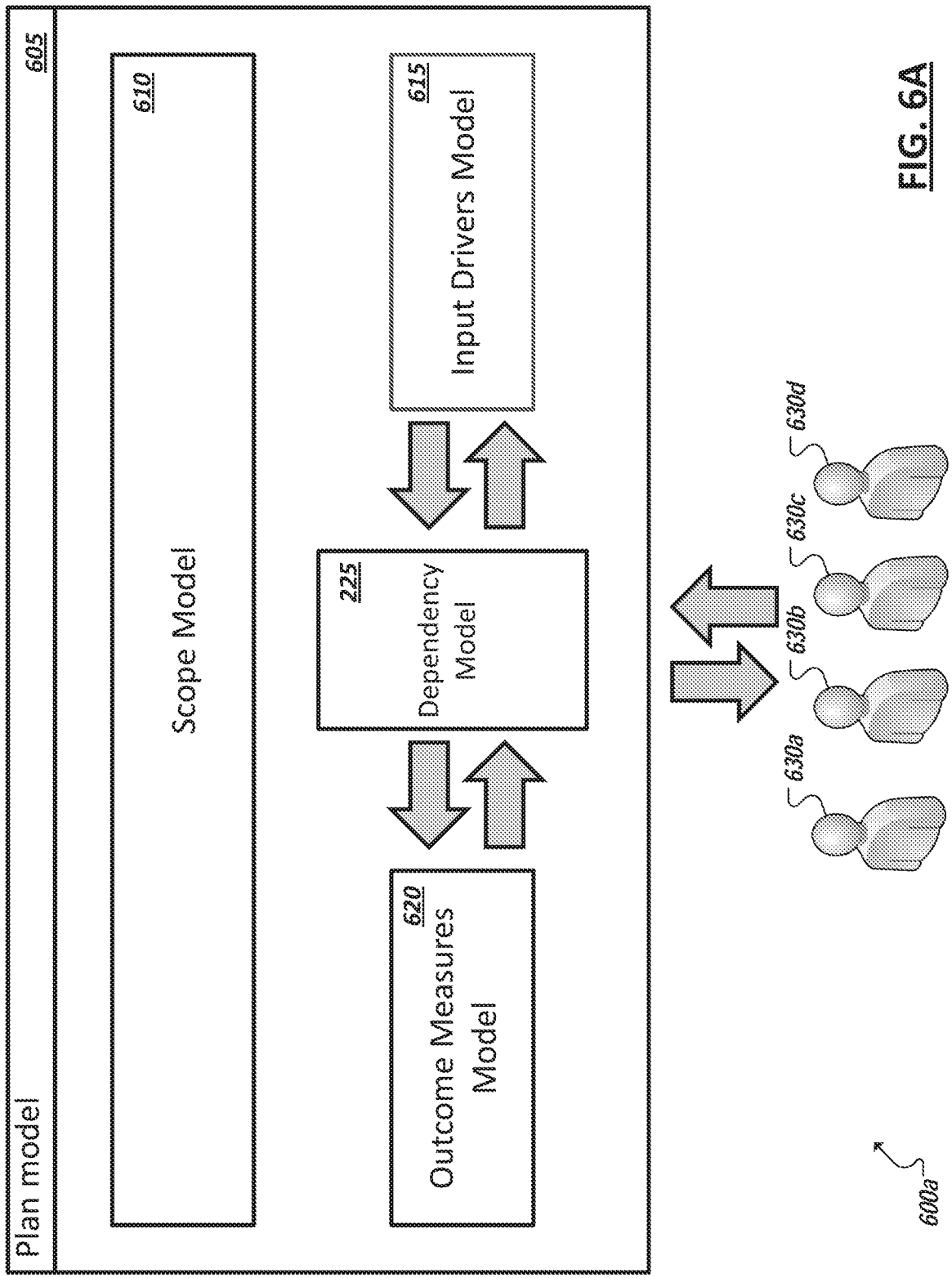
FIG. 6A is a simplified block diagram representing principles of example plan models.

Business models can include plan models that model plans, goals, and other business outcomes relating to particular domains (defined by the business entities to which the plan model applies). Turning to FIG. 6A, a simplified block diagram 600a is shown representing principles of an example, software-implemented plan model 605. As noted above, a dependency model can also be employed in connection with a plan model to assist in modeling relationships between entities and measures within (or referenced by) the plan model. A plurality of instances of plan model 605 can be developed, each instance of plan model 605 modeling a respective business outcome of an organization (or group of organizations), including business outcomes relating to administrative, educational, charity, commercial, industrial, logistic, and other for profit and not-for-profit activities of the organization. In one example implementation, a plan model can include a scope model 610, an input drivers model 615, and outcome measures model 620. Additional models can be included in or linked to by a respective plan model, such as entity models, member models, and other examples. Additionally, in some implementations, plan models can each include a process model for use in managing planning activities involving the plan model as well as coordinating planning activities between multiple plan models. Further, one or more designated users, user roles, or users within particular sub-organization (collectively users 630a-d) can be defined as authorized to interact with and use the plan model, for instance, in connection with planning activities within one or more organizations.

Generally, a scope model 610 can identify and model the specific domain within an organization on which the particular instance of the plan model 605 operates and is associated with. Domains can be relatively broad or narrow and capture certain segments of a particular organization. The scope model 610 can further enable certain domain-specific planning processes and logic relevant to the corresponding domain within the organization. Input drivers model 615 can represent one or more input driver measures specifying key variables influencing outcome measures modeled by the particular domain-specific instance of the plan model 605. Accordingly, outcome measures model 520 can model and represent the outcome measures that the particular instance of the plan model will state, predict or attempt to achieve in its modeling of a particular business outcome(s) which can also be expressed as one or more of the outcome measures modeled in outcome measures model 520. At least a portion of one or more dependency models (e.g., 225) can define the dependencies, relationships, processes, formulas, and other logic used to derive values of various outcome measures from values of input drivers of the plan model 605. Such dependencies, relationships, processes, formulas, and other logic (collectively dependencies) can be domain-specific as well as define how values of intermediate outcome measures or input drivers can be derived from other input drivers or outcome measure values, among other examples.

Figure 6B:
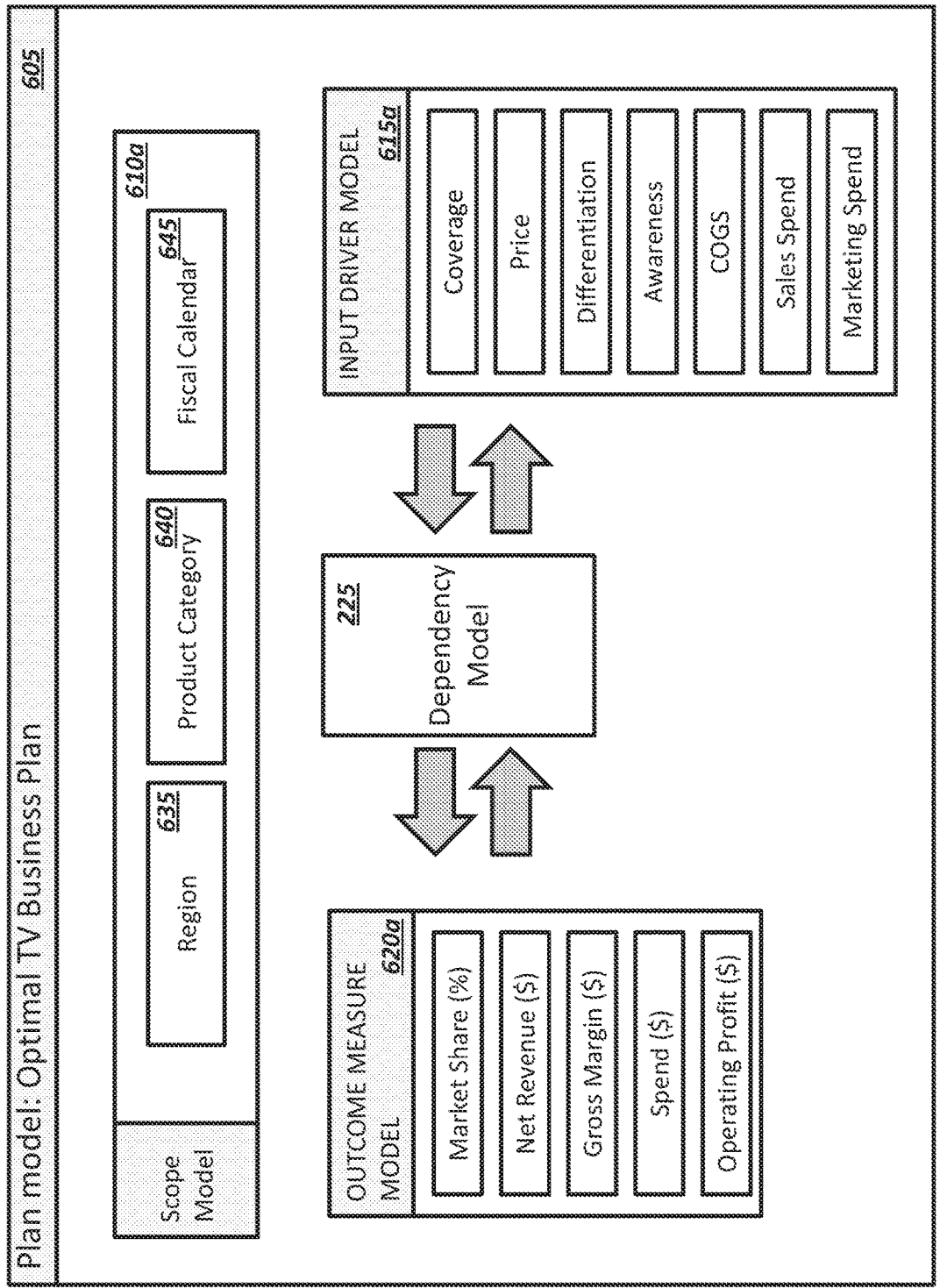
FIG. 6B is a simplified block diagram representing an example instance of a plan model.

Turning to the example of FIG. 6B, a simplified schematic block diagram 600*b* is shown of a particular example instance of a plan model 605*a*. In this example, the plan model 605*a* is an optimal television business plan model modeling outcomes for a particular product category of a business (e.g., a business selling televisions). As in the example of FIG. 6B, example plan model instance 605*a* can include a scope model 610*a*, input drivers model 615*a*, and outcome measures model 620*a* and further utilize a dependency model 225. Scope model 610*a* defines a domain to which the modeled outcomes of plan model 605*a* apply. For instance, scope model 610*a* can model a domain encompassing a particular product category (i.e., TVs), within one or more geographic regions (or market regions), and within a particular period of time (e.g., a fiscal quarter, year, five year span, etc.). Accordingly, scope model 610*a* can define the domain according to one or more business entities, such as in this example, regions, product categories, and fiscal calendar. Moreover, in this implementation, scope model 610*a* can include entity models (e.g., 635, 640, 645) corresponding to the relevant business entities used to define the domain in the scope model 610*a*.

A plan model's domain, as defined in its scope model (e.g., 610*a*) can drive other models of the plan model as the inputs, outcomes, and relationships between outcomes and inputs (e.g., as defined in dependency model 225) can be highly domain-specific and tied back to the particular business entities used to define the modeled domain. For instance, in the example input drivers model 615*a* can include such input drivers, or variables, pertaining to a television product category and product market region for televisions, including input drivers such as channel coverage, price, product differentiation, consumer awareness, cost of goods sold (COGS) or inventory cost, sales spend, marketing spend, etc. Similarly, outcome measures relevant to the outcome, or goal, modeled for the defined domain can be defined in outcome measures model 620*a*, such as market share percentage, net revenue, gross margin, total spend, operating profit, etc.

Some plan models will model outcomes of domains that result in sets of input drivers and outcome measures quite different from the input drivers and outcome measures of the particular example of FIG. 6B. However, other plan models can also be developed for different domains (e.g., a different market region, different product, products of a different organization, etc.) that include input drivers and outcome measures similar to those of the optimal television business plan model 605*a*. The dependencies of the respective outcome measures on the respective input measures of a particular domain, however, can fluctuate considerably between domains, and can each be defined in dependency model 225. For instance, sensitivity of a market share outcome measure to particular input drivers such as price or product differentiation can be quite different in two different markets, including different product markets and market regions. Accordingly, dependency model 225 can define domain-specific dependencies between input drivers and outcome measures for a plan model of a particular domain, representing the sensitivities of the outcome measures to the respective input drivers upon which the value of the outcome measure is dependent, among other examples.

Figure 7A:
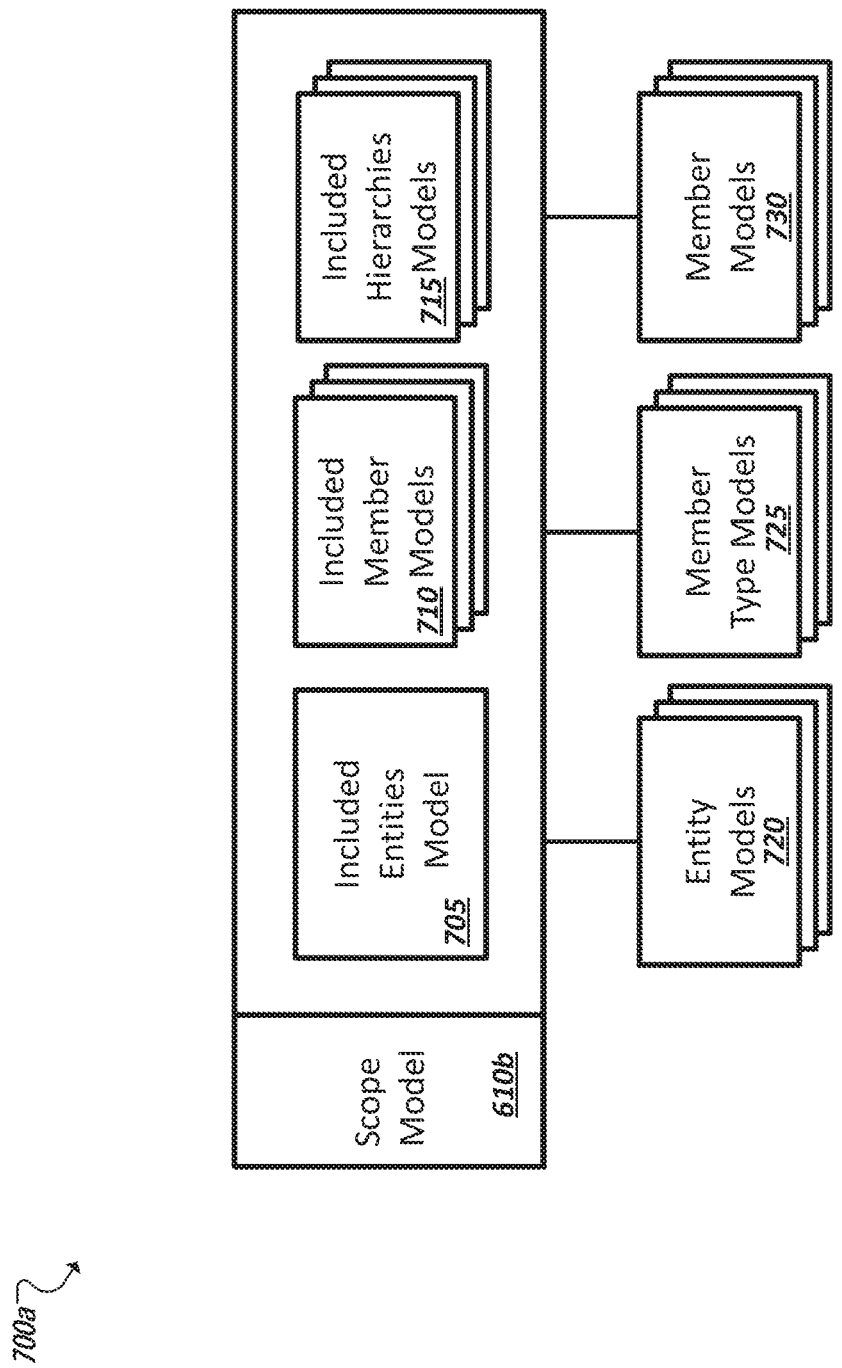
FIG. 7A is a simplified block diagram illustrating example features and models of an example scope model of an example plan model.

Turning to FIG. 7A, a simplified block diagram 700*a* is shown illustrating an example scope model structure. For instance, instances of a scope model 610*b* included in plan models can include an included entities model 705, one or more included members models 710, and one or more included hierarchies models 715 corresponding to those business entities designated as defining the particular domain of the scope model instance 610*b*. The included entities model 705 and included member models 710 can reference or link to one or more entity models 720, member type models 725, and member models 730 maintained in connection with a plan model system. As noted above and in other example discussed herein, business entities can include such entities as regions, organizations, persons, products, product categories, market regions, market segments, channels, calendar periods, time, locations, customers, suppliers, factories, and so on. The entities included in the domain can be defined in included entities model 705. A particular business entity can have constituent subcategories of business entities, or member types, and particular members of these entity member types can be included in the particular domain to which a plan model applies. Accordingly, in some examples, each entity designated in included entities model can have a corresponding set of designated members of the respective entity designated in a respective included member model 710. Additionally, for each designated entity, a set of included hierarchies (or included different possible hierarchical representations of the included members of an entity) can be designated in included hierarchies models 715 to model the variety of different levels of abstraction that can be realized from the collective relationships defined between business entities relevant to the plan, among other examples.

Further, a scope model 610*b* can reference (e.g., through included entities model 705) corresponding entity models 720 of the designated included entities of the domain modeled by the scope model. Entity models 720 can model a particular entity as well as the member types of the entity, hierarchies of the entity, and other attributes and information pertaining to the individual entity. Member type models 725 can also be referenced through the scope model, each member type model 725 modeling a particular type of the business entity as well as defining relevant attributes of that member type (or member type attributes). Further, member models 730 can be referenced, corresponding to the included member models 710, each member model 730 defining the individual members within a particular modeled domain. Each member can be of a particular one of the member type models 725. In some implementations, included member models 710 can be defined for each entity of the domain and included as sub-models of the entity models 720. Relationships between entities, member types, members (or groups (or "sets") of members), and particular member type attributes can be non-hierarchical and/or hierarchical and, in some instances, be organized in multi-dimensional hierarchies that allow members, member groups, and member type attributes to organized in multiple different alternate hierarchies and other relationships. Such relationships can also be defined in a dependency model.

Figure 7B:
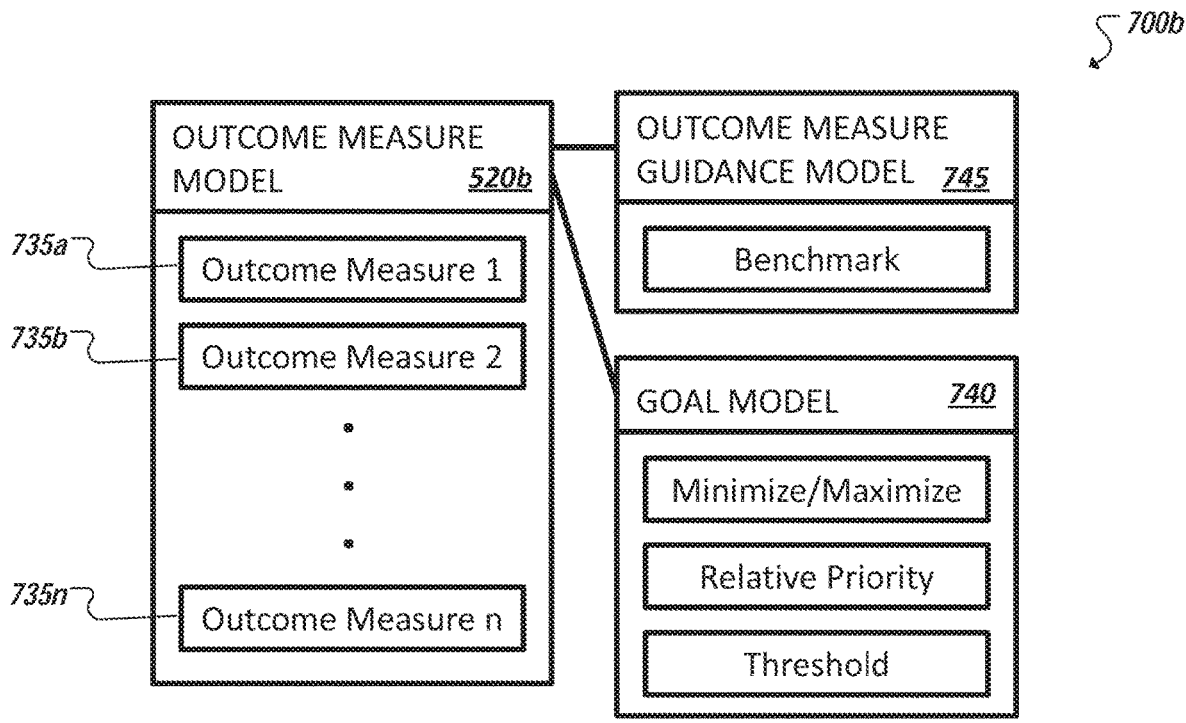
FIG. 7B is a simplified block diagram illustrating an example outcome measures model of an example plan model.
Figure 7C:
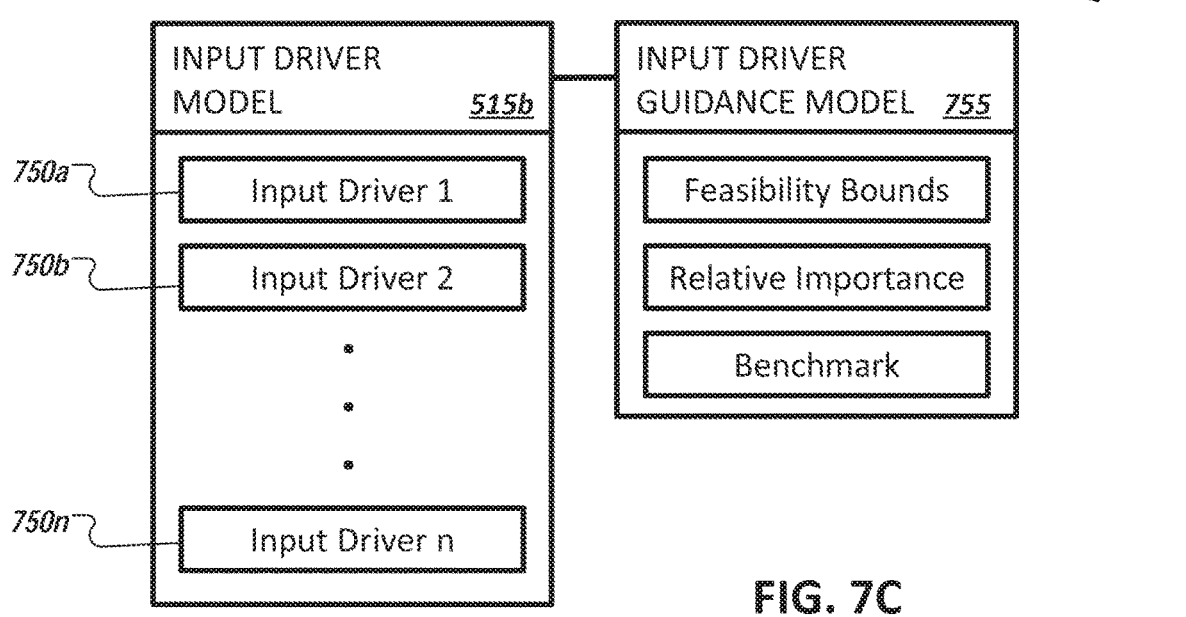
FIG. 7C is a simplified block diagram illustrating an example input drivers model of an example plan model.

Turning to FIGS. 7B and 7C, in some implementations of a plan model, in addition to defining the plan model domain and enabling distinct domain-specific modeling and input and outcome management, a plan model can additionally define the input drivers and outcome measures pertinent to the domain together with parameters and guides for the input driver and outcome measure values. Such parameters and guides can also be used to provide domain-specific guidance to users in their management, manipulation, analysis, and use of domain planning processes, goals, and outcomes modeled through plan model instances.

Turning to the simplified block diagram 700b of FIG. 7B, outcome measures of a particular plan model can themselves be modeled in instances of an outcome measures model 620b. An outcome measures model 620b can define the outcome measures (e.g., 735a-n) pertinent to the domain-specific outcomes and goals modeled by the plan model. Each defined outcome measure can represent an outcome that the plan model will state, predict or attempt to achieve. Further, the outcome measure model 620b can define, for each outcome measure, such attributes as the name, type, unit of measure, etc. of the respective outcome measure. Additionally, a goal model 740 can be defined for the provided in the plan model to define one or more goals of the plan model based on the outcomes modeled by the outcome measure model 620b. Further, in connection with the defined outcome measures 735a-n, an instance of an outcome measure guidance model 745 can further be provided in connection with the plan model.

In some implementations, a goal model 740 can be included in some implementations of plan models and can be used to reference and guide outcome measure values of the plan model. For instance, a goal model 740 can define the goals set for a particular domain modeled by the plan model and can be used as a reference point for scenarios generated using the plan model. In one example implementation, a goal model 740 can define, when applicable, minimize/maximize guidance for each outcome measure 735a-n, relative priority guidance for the outcome measures 735a-n, and threshold guidance for each outcome measure 735a-n, as well as target values for one or more outcome measures 735a-n of the plan model. The guidance model 715 can be used to model limits or targets of values of the respective outcome measures 735a-n. For instance, a guidance model can provide direction or limitations on values of outcome measures, according to one or more guidance rules defined in the outcome measure guidance model 715. For instance, a benchmark model can be included in outcome measure guidance model 715 defining guidance rules such as indicators or limits corresponding to a defined best-in-class, worst-in-class, median, market rank value, etc. Other guidance rules can be defined using other models included in outcome measure guidance model 715.

Turning to the simplified block diagram 700c of FIG. 7C, in some implementations, input drivers of plan models can be modeled through instances of an input drivers model 615b included within a respective plan model. An input drivers model 615b can define the respective input drivers (e.g., 750a-n) pertinent to the plan model's domain and specifying the key variables that influence the outcome measures and domain-specific considerations to be managed by users of the plan model. Further, an input drivers model 615b can also define, for each input driver, such attributes as the name, type, unit of measure, etc. of the respective input driver. Generally, each input driver of a plan model, represent or model particular factors that can exist or decisions that can be made that involve the modeled domain. For instance, input drivers can model decisions that can be under the control of the domain or organization, decisions outside the control of the domain or related organization(s), factors beyond the control of entities internal or external to the domain (e.g., drivers based on environment or market factors), or any combination thereof.

As with outcome measures, input driver guidance models (e.g., 755) can also be provided to model limits or targets of values of the respective input drivers 750a-n and serve to guide users in their management of input driver values and planning using the corresponding plan model. In some implementations, an input driver guidance model 755 can include feasibility bounds guidance for each of the input drivers 750a-n, relative importance guidance among the input drivers 750a-n, and benchmarking guidance for each of the input drivers 750a-n, among other examples. In some implementations, models, including plan models, can further include features described in U.S. patent application Ser. No. 13/594,744, filed Aug. 24, 2012, entitled "Distributed and Synchronized Network of Plan Models", incorporated herein by reference in its entirety.

Figure 7D:
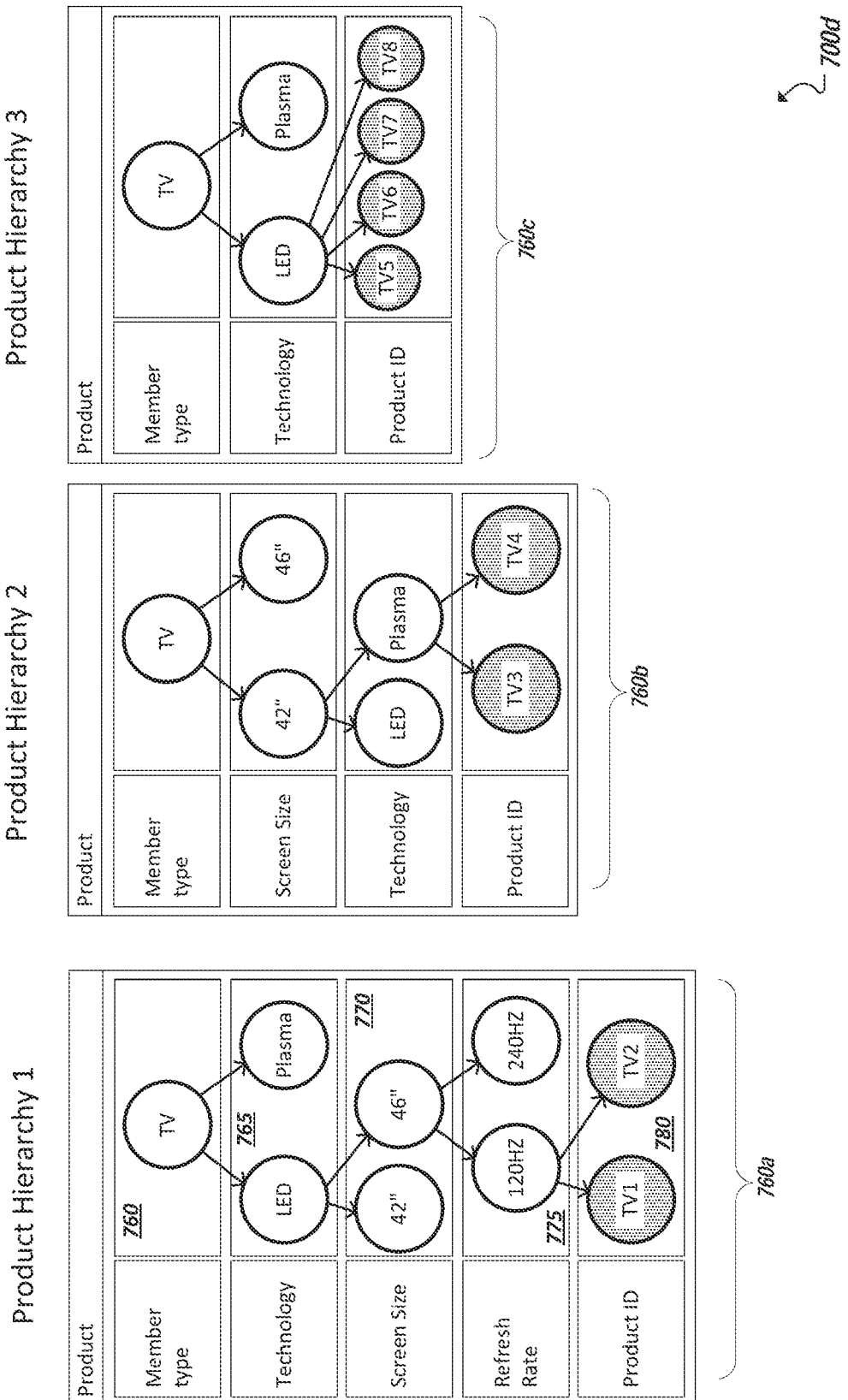
FIG. 7D is a simplified block diagram illustrating available hierarchies defined for an example business model.

As noted above, a plan model can include an included hierarchies model (e.g., 715). In some instances, multiple alternate hierarchies can exist (and be defined in a dependency model) for a business entity and serve to represent members of the entity at varying levels of aggregation. These various, available hierarchies can represent multiple levels of abstraction at which an entity can be modeled. The set of hierarchies within a defined domain can be modeled in a scope model (e.g., 610), such as through included hierarchies models. In some implementations, these levels of aggregation can also be based on or formed from the varying combinations of member groups that can be defined within a business entity. Turning to the example of FIG. 7D, a set 700d of three block diagrams are shown representing example available hierarchies 760a-c of a particular business entity. More specifically, in the particular example of FIG. 7D, three available hierarchies 760a-c are shown of a product business entity included in a domain also specified by members of member type "television," similar to the example television member type in the illustrative example of FIG. 3B. In a first (760a) of the available hierarchies 760a-c, television technology type is designated as the first level of aggregation within the hierarchy 760a. Further, in the example hierarchy 760a screen size is designated as a child to technology type and refresh rate as a child of screen size. Based on this designated hierarchy 760a various groupings of members can be identified and aggregated at the levels of aggregation defined by the hierarchy 760a. For instance, a highest level of aggregation 765 in hierarchy 760a can include all members of member type television. At a second highest level of aggregation 770 in hierarchy 760a, two distinct member groups can be identified for two member groups defined by their respective shared technology types (e.g., a LED member group and plasma member group). Further at the next level of aggregation 775, respective sub-member groups of the LED and plasma member groups can be defined according to the screen sizes of constituent members included in each of the LED and plasma member groups. For instance, 42" LED television member group can be included or defined at level of aggregation 770. Further, still lower levels of aggregations (e.g., 775, 780) can be provided based on the defined hierarchy 760a. Indeed, a lowest level of aggregation 780 can be provided representing the individual (i.e., ungrouped) members themselves (e.g., as identified by a member ID attribute of the member type, such as "Product ID"). In addition to hierarchy 760*a* of a product business entity of an example plan model, further hierarchies 760*b* and 760*c* can be provided organizing the product business entity according to other member attributes and defining further potential member groups and levels of aggregation, as illustrated in the example of FIG. 7D.

Planning and outcomes within a domain can be further modeled based on the domain-specific relationships between input drivers and outcome measures defined in a dependency model associated with a corresponding plan model. Relationships defined in a dependency model can reflect the sensitivity of various outcome measure values on changes to the values of one or more input drivers specific to the corresponding domain of the respective plan model. Further, dependency models can additionally model aggregation relationships, including logic and formulas for calculating how an input driver value or outcome measure value can be disaggregated or split among member groups at varying levels of aggregations. Still further, in some instances, some input driver values can be at least partially dependent on other input driver values and, similarly, outcome measure values can be at least partially dependent on other outcome measure values. Accordingly, dependency models can further model these dependencies and sensitivities between values of input drivers on other input drivers and outcome measures on other outcome measures.

Dependency models can be processed (e.g., by a formula engine) to determine a propagation sequence for how changes to defined input driver values (or outcome measure values) affect other input drivers' and outcome measures' values. The propagation sequence can define an order or path for how value changes cascade through measures, such as from an input driver or outcome measure of a plan model to other related input drivers and outcome measures. Relationships defined in a dependency model can be derived based on user inputs as well as through automated techniques, including the use of data mining (to discover trends and relationships between market entities), regression analysis, design of experiments, and other analysis methods, among other example techniques.

Figure 8A:
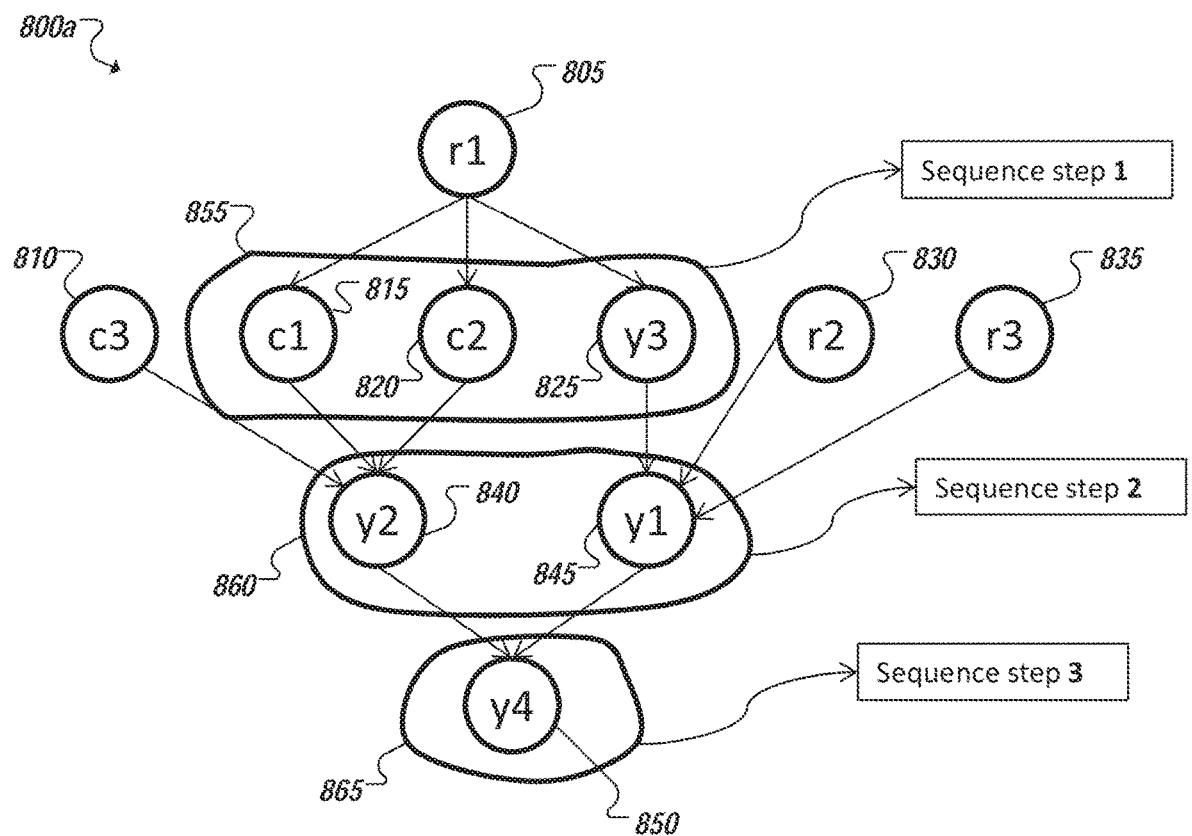
FIG. 8A is a simplified block diagram illustrating an example propagation sequence of an example business model.

Turning to FIG. 8A, a simplified block diagram 800*a* is shown illustrating principles of an example propagation of changes determined from a dependency model affecting an example plan model. In some implementations, a propagation model can be generated to describe the propagation sequences that result, for each measure, based on relationships and dependencies defined in a related dependency model. Each propagation sequence can define how changes to values of the specific corresponding measure, such as an input driver or outcome measure, propagate to affect values of other measures, such as other input drivers and outcome measures in one or more plan models. Further, a propagation model can additionally enforce constraints to prevent circular references and other conditions. Additionally, propagation models can be used to dictate events allowing or requesting user inputs, such as in instances where an input driver (or outcome measure) is identified in a propagation sequence that lacks a defined relationships, dependency, or correlation within a dependency model, among other examples. Additionally, visual representations of a propagation sequences can be generated from the dependency model (or propagation models) for presentation on a display device to users, for instance, in connection with a scenario planning session based on a corresponding plan model, among other examples.

In the particular example of FIG. 8A, an example propagation sequence is illustrated showing how a variety of different example outcome measures and input drivers can be interconnected within the context of a particular example plan model. For instance, in the example of FIG. 8A, an example propagation sequence can be determined from a dependency model to identify how changes to values of input driver 805 can involve a plurality of other input driver measures (e.g., 810, 815, 820, 830, 835) and a plurality of outcome measures (e.g., 825, 840, 845, 850). Other examples can include more or fewer input drivers and/or outcome measures, and in some instances, a single outcome measure or a single input driver, among other examples. In the particular example of FIG. 8A, the values of two other input drivers 815, 820 and an output measure 825 can be dependent on and affected by changes to the value of input driver r1 (805). This can be considered a first sequence step 855. As the values of input drivers 815, 820 and outcome measure 825 are at least partially dependent on input driver r1 (805), other input drivers and outcome measures (e.g., 840, 845) dependent on input drivers 815, 820 and outcome measure 825 can also thus be affected by the change to the value of input driver r1 (805). As input drivers and outcome measures can be dependent on values of multiple different other input drivers and outcome measures, subsequent sequence steps (e.g., 860, 865) defining a propagation sequence for changes to the value of input driver r1 (805) can also be dependent on (and wait for) values of these other input drivers and outcome measures (e.g., 810, 815, 820). Some dependent input drivers (e.g., 810, 815) and outcome measures (e.g., 820) may only be a single sequence removed from the first input driver r1 (805), while others measures are more removed within the propagation sequence, such as outcome measures 840, 845, 850 affected at second (860) and third (865) sequence steps of this particular example propagation sequence.

Figure 8B:
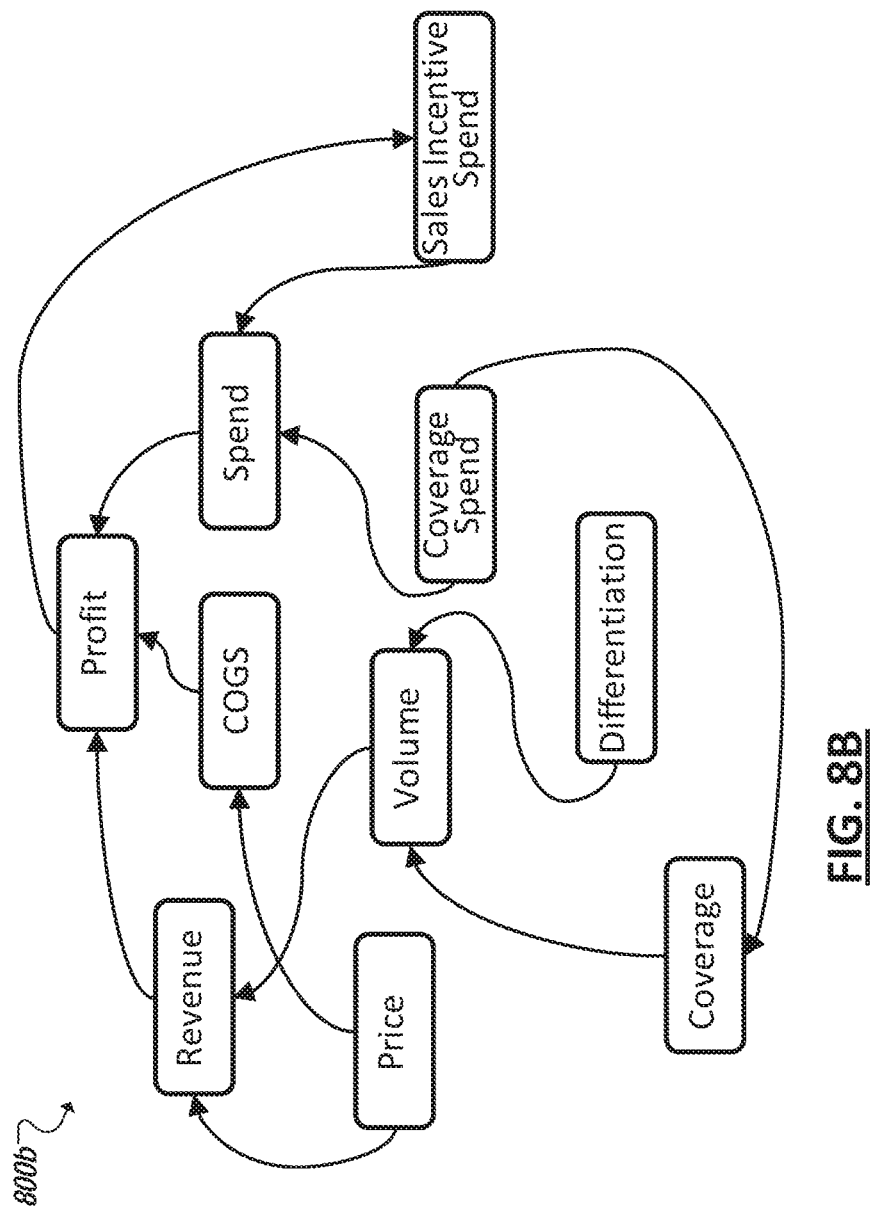
FIG. 8B is a simplified block diagram illustrating a network of relationships between a plurality of measures in one example implementation.

Turning to FIG. 8B, a simplified representation 800*b* is shown illustrating an example of how input drivers and outcome measures can be interrelated (as defined in a corresponding dependency model). In this example, the measures correspond to such domain-specific variables, decisions, and outcomes as Profit, Revenue, Cost of Goods Sold (COGS), Spend, Sales Volume, Channel Coverage, Coverage Spend, Sales Incentive Spend, Product Differentiation, Price, among potential others. Consequently also, a web of potential propagation sequences (and correlation models) can be defined for the various interconnections and dependencies of values of input drivers and outcome measures represented in the particular example of FIG. 8B. For instance, Profit can be a function of Revenue, COGS and Spend; Revenue can be a function of Price and Volume; Volume a function of Coverage and Differentiation; and so on. Further, a formula engine can include logic for identifying situations where infinite loops of evaluation can occur, such as circular references, so as to avoid such instance. For instance, because Sales Incentive is a function of Profit, Profit is a function of Spend, and Spend is a function of Sales Incentive Spend in this example, the formula engine can halt, suspend, or otherwise guard against evaluation through an infinite loop due to this inherent circular reference between corresponding input drivers and outcome measures.

As noted above, relationships can be defined within a model (e.g., between entities and measures), or across and between multiple models. For instance, a particular plan model can be but a single plan model in a network of plan models for an organization (or group of organizations). Indeed, plan models can be adapted to be interconnected with other plan models in a network of plan models. In this example, as each plan model can be tailored to objectives and goals of a particular defined domain, a network of interconnected plan models, each corresponding to a distinct domain, can provide a powerful system of software-based models enabling interactive, quick, collaborative decision making across the different plan models and, consequently, across multiple different, corresponding domains of an organization. Each plan model can independently model goals of its particular domain as well as be adapted to interconnect to other plan models to generate multi-domain scenarios and perform multi-domain planning activities using multiple plan models. In some implementations, dependency models defining the interconnections between models can be used to facilitate such multi-plan model activities.

Figure 9A:
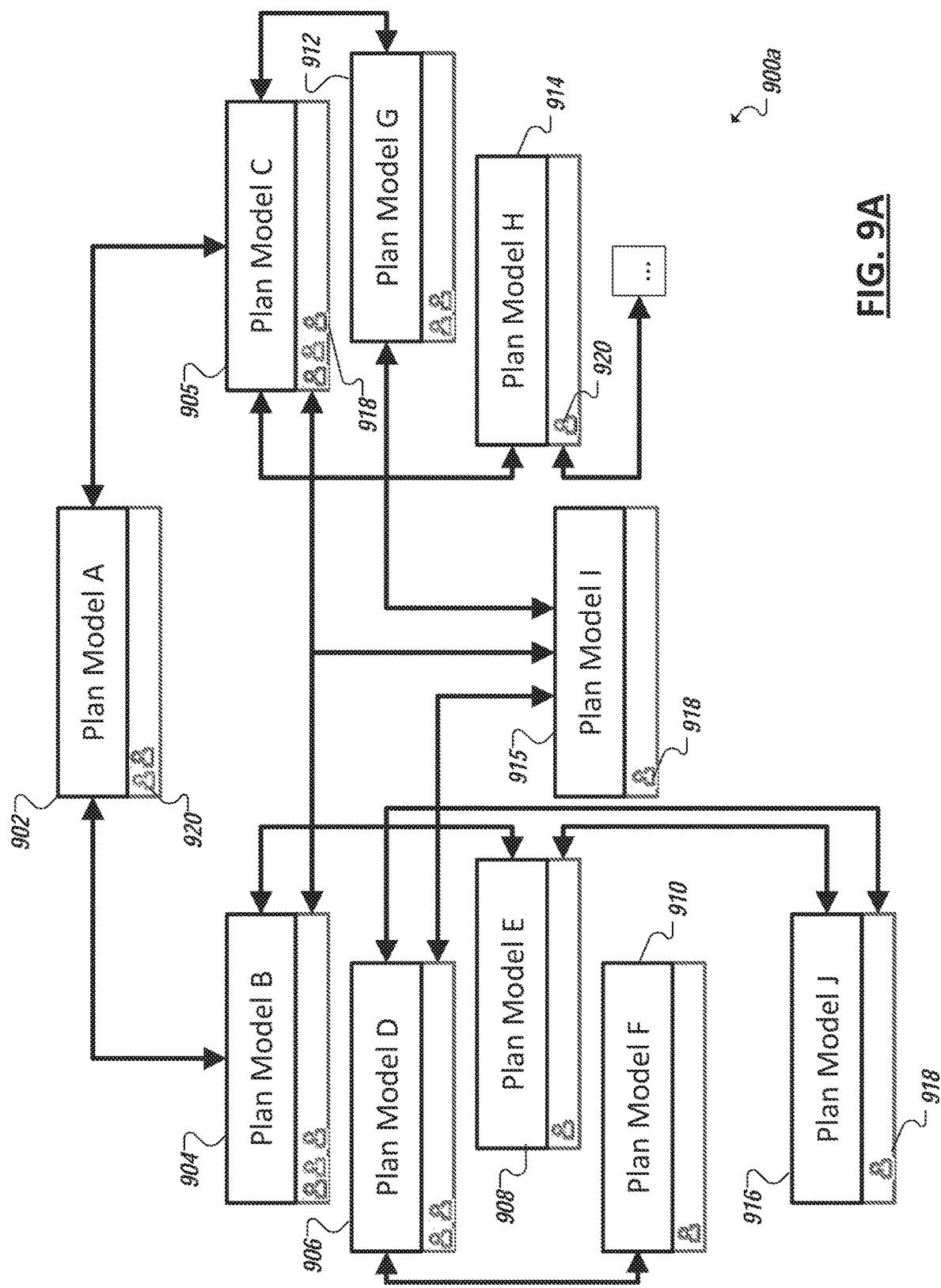
FIGS. 9A-9B are simplified block diagrams illustrating example networks of plan models.

Turning to the example of FIG. 9A, a simplified block diagram is shown representing a network 900 of plan models (e.g., 902, 904, 905, 906, 908, 910, 912, 914, 915, 916). Plan models in the network 900 can be interconnected with one or more different other plan models in the network 900 based on one or more input drivers of the plan model being dependent on one or more outcome measures (or even input drivers) of another plan model in the network 900 (as defined in a dependency model). Further, a plan model in the network 900 can also be interconnected with other plan models in the network 900 by virtue of an outcome measure (or input driver) of the plan model driving values of input drivers of the other plan model. Each plan model in the network 900 with respective included scope models, input drivers models, outcome measures models, etc. The respective models of each plan model in the network 900 can be tailored to model outcomes for a particular, distinct domain within the network, including representative scope models, sets of input drivers and outcome measures, etc.

Further, different users (or groups of users) (e.g., 918, 920) within an organization (or organizations) of the network 900 of plan models can be assigned to or associated with particular plan models in the network 900. Such associations can be based, for instance, on the users' respective roles, office locations, departments, etc. within the organization, with particular plan models being made available to those users corresponding to the particular defined domain of the respective plan model. As a simplified example, a particular user can be a manager of a particular department of an organization that is responsible for one or more different product lines. As the particular user 918 can be responsible for managing, planning, and making decisions within this particular realm of the organization, the particular user 918 can be associated with plan models that relate to the user's role, such as plan models (e.g., 905, 915, 916) with domains corresponding to the particular department or constituent product lines of the user. Being associated with the plan models can authorize access and use of the respective plan models 905, 915, 916 associated with the user in some instances. Other users not associated with the plan models 905, 915, 916 may be blocked or limited in their ability to access and use the plan model 905, 915, 916. However, other users (e.g., 920) can be associated with other plan models (e.g., 902) with domains more pertinent to their role within an organization. Some users can be associated with multiple plan models based on their role(s) within the organization, among other examples.

Dependencies between values of outcome measures (or other input drivers) of one plan model and input drivers (or outcome measures) of another plan model can be defined through associated dependency models. Each relationship, or link, defined in the dependency model can be specific to a single input driver-outcome measure pair (or input driver-input driver or outcome measure-outcome measure pair) of a plan model. In some cases, a single input driver of one plan can depend on more than one outcome measures from other plans. For example, [Optimal TV Sales Plan].[Differentiation] can be computed based on both [Optimal TV R&D Plan].[Differentiation] and [TV Mkt Intelligence Model].[Competitive Landscape]. A link can define such aspects of the relationship as the algorithms and functions determining the sensitivity and dependence of the input driver on the outcome measure, as well as aggregation and disaggregation relationships (i.e., allowing modeling of the effects of inter-plan-model dependencies at their respective levels of aggregation), filter conditions applicable to the input driver-outcome measure pair, and so on. Linking expressions can further utilize established dimension- and attribute-based relationships between members of two or more different plan models.

Figure 9B:
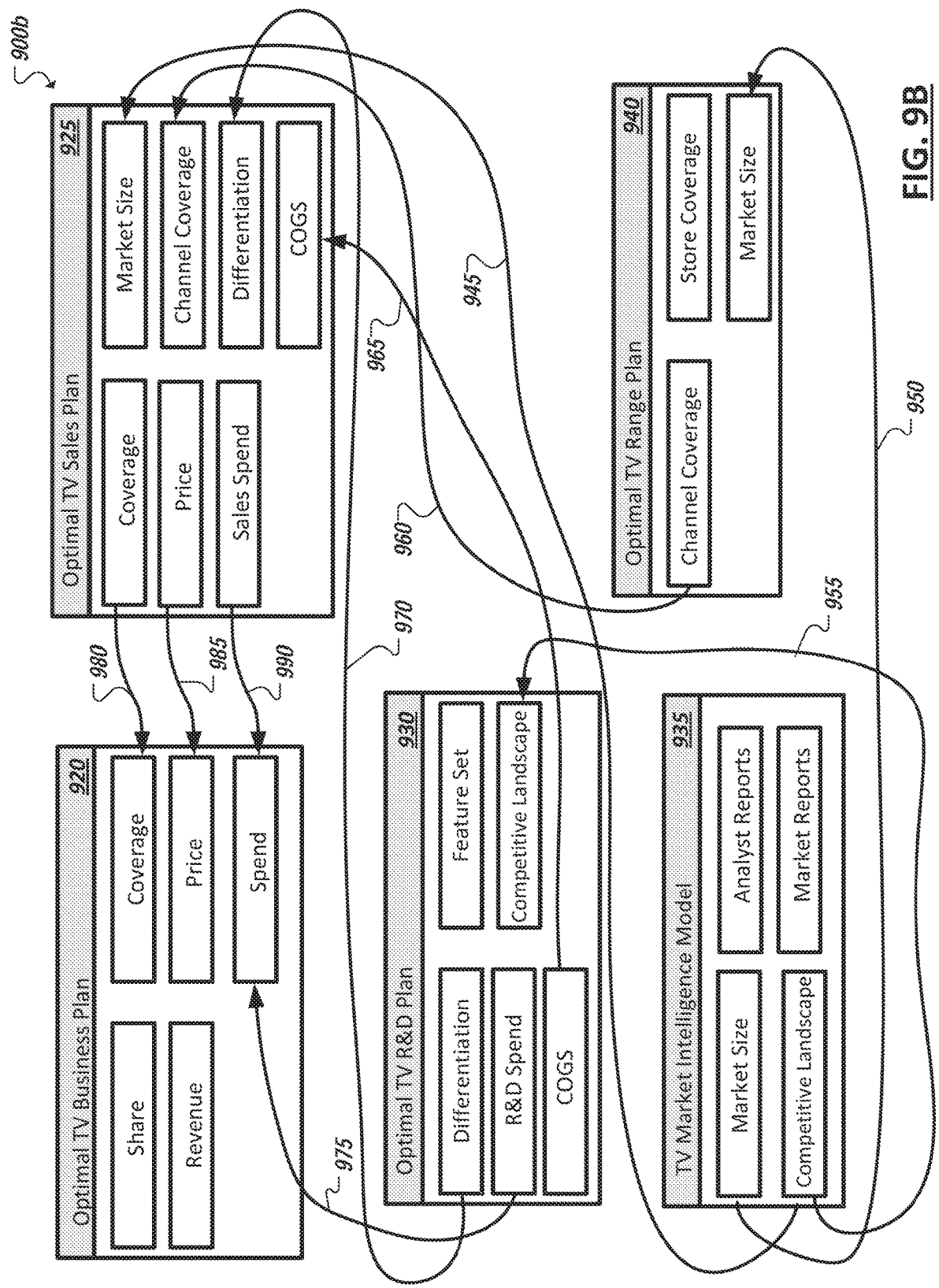

Linking of plan models can allow for analysis of one or more plan models as the focus of a planning activity (e.g., the "focus plan models" of the planning activity), based at least in part on the dependencies of the focus plan models on other plan models to which they are linked through links defined by a dependency model (or the "linked" plan models of the focus plan models). FIG. 9B illustrates one potential example of links (e.g., 945, 950, 955, 960, 965, 970, 975, 980, 985, 990) between example plan models (e.g., 920, 925, 930, 935, 940) in a network 900*b* of plan models. In the example of FIG. 9B, input drivers of each of the represented plan models 920, 925, 930, 935, 940 are listed in a right column and outcome measures in a left column. For instance, example Optimal TV Business Plan plan model 920 can include input drivers Coverage, Price, and Spend while including outcome measures Share and Revenue. As further illustrated by FIG. 9B, inputs drivers of the example Optimal TV Business Plan plan model 920 can be based on outcome measures of other plan models. For instance, values of Coverage input driver of example Optimal TV Business Plan plan model 920 can be dependent on a Coverage outcome measure of example Optimal TV Sales Plan plan model 925, the dependency defined through a link 980. Similarly, the Price input driver of plan model 920 can be dependent on a Price outcome measure of plan model 925 and the Spend input driver of plan model 920 can be dependent on multiple outcome measures (Sales Spend and R&D Spend) of two different plan models (e.g., 925, 930), with respective links (e.g., 990, 975) defining the dependencies between the respective input drivers and outcome measures.

Continuing with the discussion of FIG. 9B, an example plan model can serve as a focus plan model in one activity and as a linked plan model in another activity (e.g., where one of the example plan model's linked plan models is the focus plan model). For instance, while input drivers of plan model 920 are represented as dependent on outcome measures of Optimal TV Sales Plan plan model 925, the Optimal TV Sales Plan plan model's 925 may itself be dependent on values of other plan models in the network 900*b*, such as defined by links 945, 960, 965, 970, among other examples. Generally, the interconnection of plan models (e.g., 920, 925, 930, 935, 940) in a network of plan models (e.g., 900*b*) can enable scenario planning, analyses, and other uses across multiple plan models. This can further enable users of the network of plan models to cross-collaborate and plan across multiple, corresponding domains within an organization. For instance, links between plan models can enable an ask-response collaboration protocol within the network of plan models as well as automated network propagation between multiple plan models in the network 900*b*, among other example activities.

Given the interconnection of plan models, a single input driver or outcome measure of any given plan model can be considered dependent on values of other interconnected plan models' input drivers and outcome measures. In other words, a computation corresponding to a computed measure can depend recursively on various other computations based on multiple other measures in a set of models (e.g., the network of plan models). In simple analyses, these dependencies can be ignored. However, as illustrated in the example above, a chain or sequence of links can be leveraged to more completely model effects and dependencies across multiple models. Automated propagation can automate propagation of a change or query (e.g., ask-response) across multiple models, for instance, from a first focus plan model (e.g., 920) to a first requested linked plan model (e.g., 925) prompting the automated propagation to other plan models (e.g., 930, 935, 940) upon which the first linked plan model (e.g., 930) is dependent. Automated propagation can further enable and drive execution of goal-based scenario planning involving two or more linked plan models, including plan models within a network of plan models (e.g., 900*b*), among other examples. Indeed, many other examples of ask-response exchanges and automated propagation between plan models are possible, not only within the context of this particular example, but generally across any conceived network of models, particularly considering the potentially infinite number of different models that can be developed to model various domains and the potentially infinite ways such models can be interconnected in model networks modeling organizations and other entities.

As discussed above, one or more plan models can be used in a variety of ways to model and analyze particular outcomes, goals, objectives, scenarios, and other characteristics of related domains. For instance, input driver scenario planning can be enabled through the use of one or more models. Turning to the example of FIG. 10A, a simplified block diagram 1000*a* is shown representing principles of an example scenario planning session involving one or more models (such as linked models in a network of plan models). Values of input drivers (or outcome measures) of a particular plan model can be set to any number of values or combination values, based, for instance, on the restraints set explicitly and inherently through the structure of the particular domain-specific plan model (e.g., through input driver and outcome measure guidance rules). Accordingly, multiple scenarios can be generated based on different versions of the same plan model(s), each scenario defined by the particular input driver values (and/or outcome measure values) set for that version of the plan model(s). Accordingly, plan model versions can represent a scenario capturing a set of plan model values and the effects (outcomes) generated from those values. Further, a given scenario can be developed from one or more plan models, saved, and identified by values such as a scenario name, date of creation, identification of the user(s) that created the scenario, a description of the scenario, and so on. Plan models that are recorded and archived in the generation of scenarios can be managed, in some implementations, through a plan version control model. The plan version control model can allow for analytics to be conducted on the various versions that are stored. The plan version control model can also provide for management that defines the number of scenarios that the system can simultaneously evaluate and compare, among other examples.

Figure 10A:
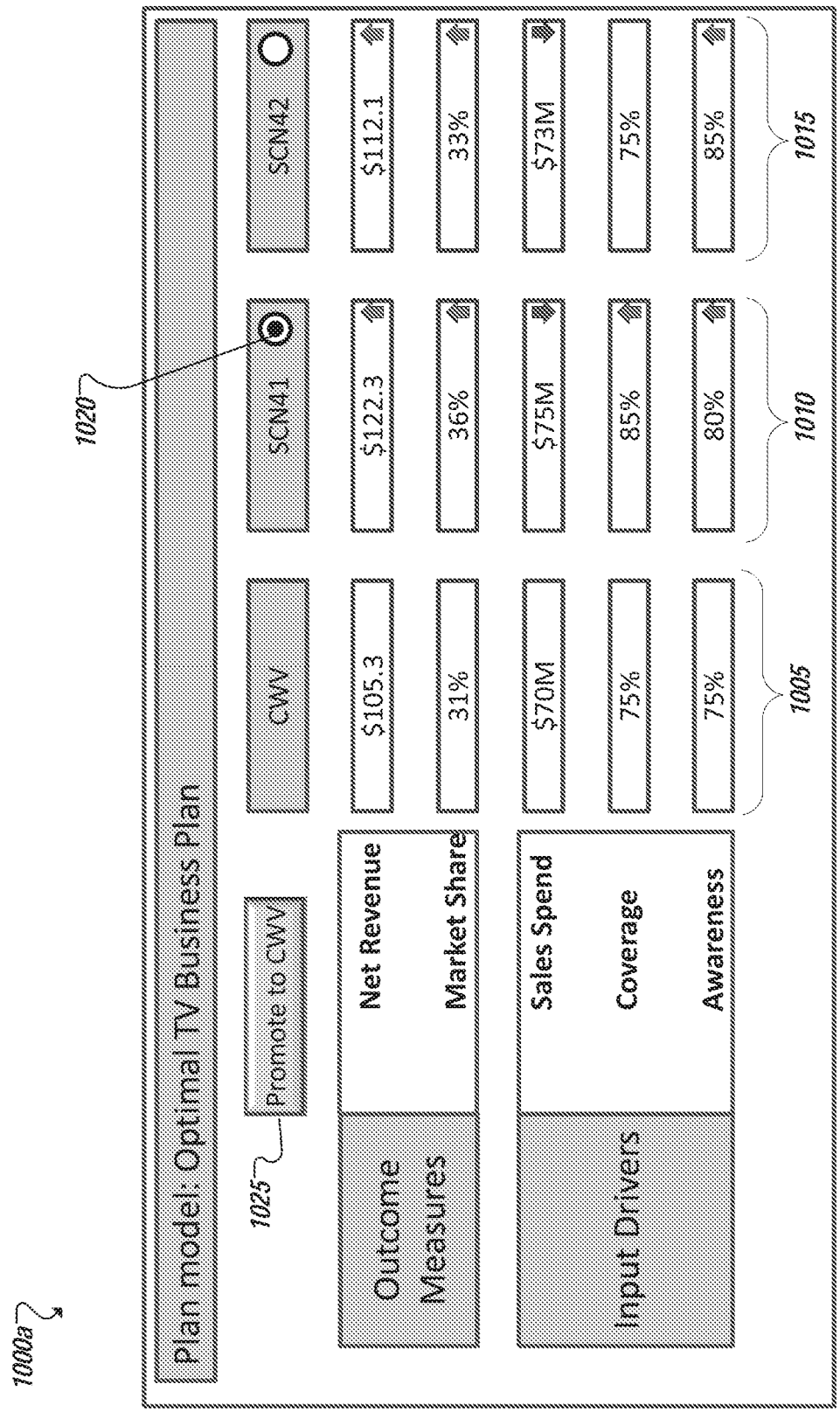
FIG. 10A is a simplified block diagram illustrating principles of input driver scenario planning utilizing one or more plan models.

In the example of FIG. 10A, at least three scenarios 1005, 1010, 1015 have been developed based on the same set of one or more plan models and further based on relationships defined in one or more associated dependency models. The plan model(s) upon which the scenarios 1005, 1010, 1015 have been based can include outcome measures Net Revenue and Market Share and input drivers Sales Spend, Coverage, and Awareness. As shown in the example of FIG. 10A, scenarios 1005, 1010, 1015 can have different defined input driver values for each of the combination of example input drivers Sales Spend, Coverage, and Awareness. Correspondingly, the respective outcome measures of the three scenarios 1005, 1010, 1015 can also be different. Alternatively, outcome measure values can be defined and input driver values derived that permit the specified outcome measure values, among other examples.

Through input driver scenario planning, users can be provided with interactive user interfaces presenting users with a view of the relevant input drivers and outcome measures of plan models used in the scenario planning that drive and model the particular scenario. In some instances, a scenario can only pertain to a subset of the available input drivers and outcome measures of the plan model(s) used in the scenario planning. Further, input drivers and outcome measures can be viewed at particular levels of aggregation available through the plan models and defined for the scenario planning. For instance, a scenario may be concerned with analyzing input driver values and responsive outcome measures for breakfast cereal in Germany, whereas the plan models used in the scenario planning model higher levels of aggregation, such as Food Products (e.g., of which breakfast cereal is one member group at a particular level of aggregation) and Worldwide Geographical Regions (e.g., of which Germany is one member group at a particular level of aggregation falling below a highest level of aggregation including all regions in the world), among other examples.

Input driver scenario planning can be utilized to allow users to manipulate values of a set of input drivers exposed by the plan models used in the scenario planning to observe effects on related outcome measure values. A formula engine can utilize a corresponding dependency model to determine how the manipulated values affect values of other measures in a set, or network, of models. For instance, input driver scenario planning can involve planning across multiple plan models, with modeling of at least some outcomes based on automated propagation of values of input drivers of a first plan model affecting input driver and outcome measure values of other plan models linked to the first plan model through links defined in a corresponding dependency model, among other examples. In some instances, users can manipulate values iteratively in an attempt to realize what combinations of input driver values result in an optimal, hypothetical, or other desired outcome measure value(s). For instance, a user can be presented with a user interface (e.g., adopting a presentation similar to the example of FIG. 10A), and view values of input drivers and outcome measures of one or more scenarios as defined in one or more plan models used in the scenario(s). From the view, the user can manipulate one or more input driver values and observe how the manipulations affect values of the corresponding outcome measures of the scenario (e.g., 1010), as well as compare how the resulting scenario values compare against goals of the domain (e.g., as defined in a goal model of the plan model) or values set in other versions (e.g., 1005, 1015) of the same scenario. This can be facilitated through a formula engine referencing a corresponding dependency model to determine the full set of computations and outcome measures that are affected by a change in an input driver value. The formula engine then executes all of the identified, corresponding computations to generate the new values of outcome measures (e.g., for presentation in a user interface). Further, in some implementations, a user may determine that underlying plan models or other factors cause incorrect or unrealistic outcome measures (or input drivers) to be generated in a scenario based on the plan models and may override one or more values manually, for instance, by providing a substitute value and marking the substitution as an override. Such manual overrides can then be used, in some implementations, as feedback for improving or correcting the plan models (or even the dependency model(s)) underlying the manipulated scenario.

Scenario planning can involve the definition of a particular scenario from one or more plan models, as well as the selection of input drivers and outcome measures of interest together with selected levels of aggregation for the values of the inputs drivers and outcome measures. In other instances, a scenario planning session can instead be based on a pre-existing scenario, such as a previously generated scenario or scenario template. For example, in some instances, the manager or user of a particular plan model or scenario can set a scenario with values representing a current working view of the user, user group, or organization. In one example, the current working view can represent the most ideal version of the scenario (and related plan models) yet realized during scenario planning. Consequently, in some examples, such as the example of FIG. 10A, a user can use a saved current working view scenario (e.g., "CWV" 1005) as the basis for a subsequent scenario, such as scenarios "SCN41" (1010) and "SCN42" (1015). A pre-existing scenario used as the basis for another scenario can be considered the "seed scenario" of the new scenario. The seed scenario can supply not only the basic structure of the scenario (e.g., the plan model, input drivers, outcome measures, levels of aggregations used, etc.) but also a set of default values, such as the values of input drivers and outcome measures defined in the seed scenario. Scenarios can also be generated "from scratch," through the identification of one or more focus plan models and other parameters designating the levels of aggregation to be employed, the extent to which linked models should be considered, etc.

Figure 10B:
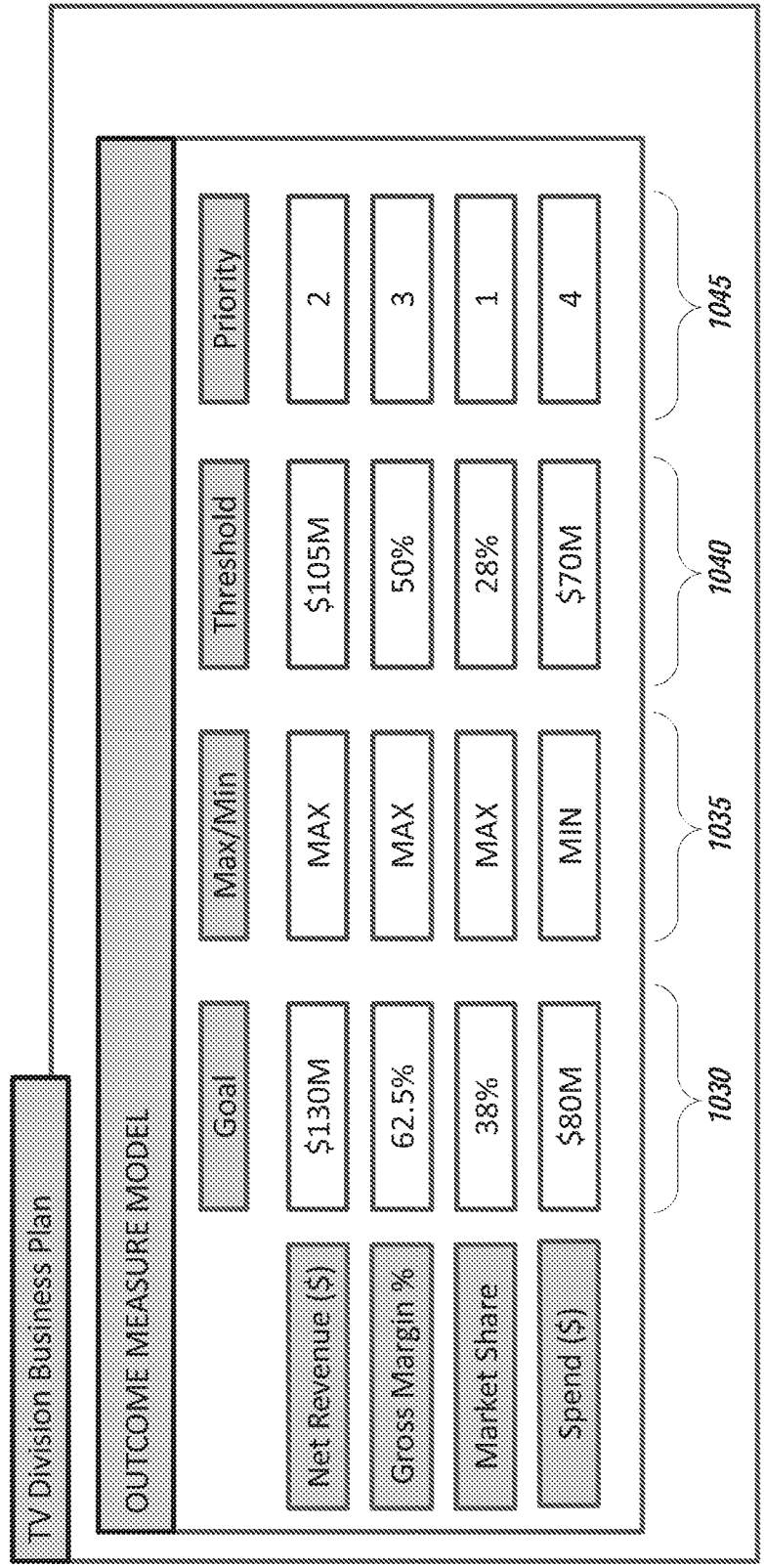
FIG. 10B is a simplified block diagram illustrating principles of goal-based scenario planning utilizing one or more plan models.

In addition to input driver scenario planning, goal-based scenario planning can also be enabled through the use of one or more plan models, as represented in FIG. 10B. Goal-based scenario planning can be utilized by users to automatically generate and present scenarios based on one or more specified goal values for outcome measures of one or more focus plan models. Accordingly, goal-based scenarios, rather than being input driver-driven can be based on changes or definitions to outcome measure values of plan models underlying the scenario(s). Applying principles similar to those described in connection with automated propagation within plan model networks, one or more goal values or value ranges for outcome measures of underlying plan models can be set (e.g., by a user) and serve as the basis for determining sets of input driver values that would realize, or at least approximate, if possible, the set goal values, based on the definitions of the underlying plan models and the dependencies and relationships defined in associated dependency models. Indeed, in instances where multiple sets of possible input driver values are identified as realizing a particular outcome measure goal, a plurality of distinct scenario versions can be generated corresponding to each set of possible input driver values. The resulting set of scenarios can then be compared, such as through a presentation similar to that in FIG. 10A, to allow a user to assess the versions and determine and promote a most-desirable one of the generated scenarios, for example, to a current working view or plan of record, among other use cases.

Goal values, in some instances, can include non-discrete values, such as in instances where the goal is to maximize or minimize a particular outcome measure value. In some instances, outcome measure guidance, as well as input driver guidance, defined in underlying plan models can be used in the setting of one or more goal values together with guiding and filtering the sets of input driver values derived to achieve the specified goal value(s). In the example of FIG. 10B, a simplified example user interface 1000b is presented in connection with an example goal-based scenario planning session. Through the user interface 1000b, a user can view and select a variety of values for a set of outcome measures included in the goal-based scenario, such as a Net Revenue outcome measure, Gross Margin outcome measure, Market Share outcome measure, and Spend outcome measure. Values (e.g., 1030) of the set of outcome measures can be manipulated in connection with the example goal-based scenario planning session, as well as values of outcome measure guidance rules and goal model parameters (e.g., 1035, 1040, 1045) provided through the plan models underlying the scenario. For example, a user can set a particular goal value (e.g., 1030), threshold values (e.g., 1035), minimization/maximization guidance (e.g., 1040, for instance, in the event the goal value 1030 of any one of the outcome measures cannot be reached), and relative priority guidance values (e.g., 1045) for any combination of the outcome measures. Based on the selections, one or more sets of corresponding input driver values can be returned, as well as, in some instances, generated scenarios incorporating the input driver values and additional feedback data, such as data indicating what input drivers, dependencies, other plan models, are preventing a particular goal value or set of goal values from being realized, among other examples. Additionally, as in input driver scenario planning, in some implementations, users may be provided with the additional option of manually overriding values of scenarios generated in response to provided goal values, for instance, to more accurately capture real world attributes of the domain modeled by the plan models underlying the scenario(s).

Figure 11:
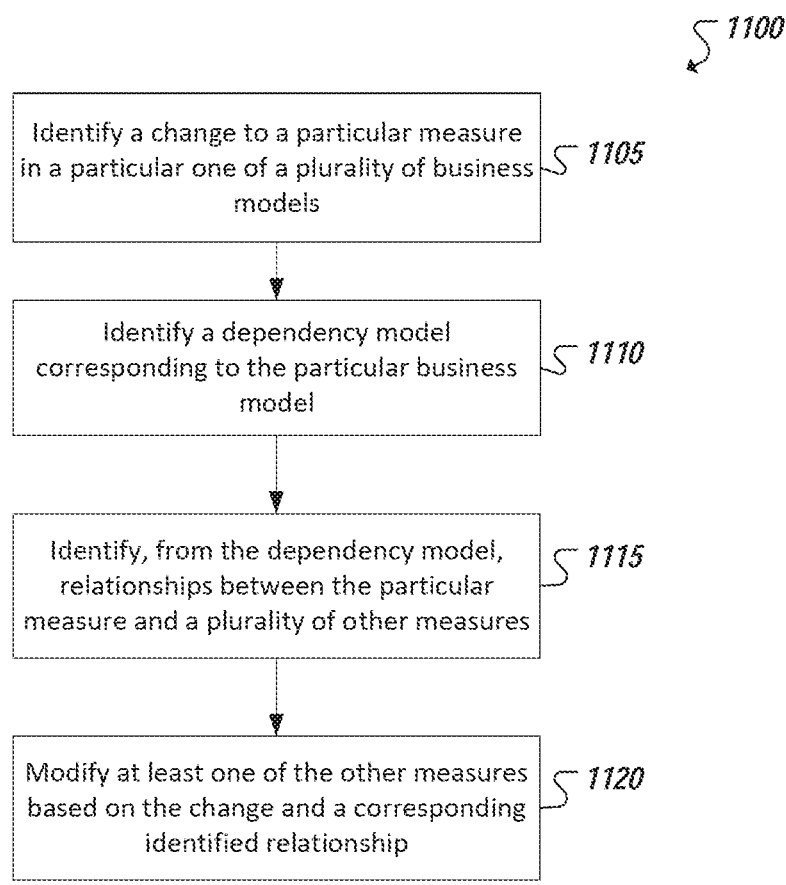
FIG. 11 is a flowchart of an example technique for using an example dependency model in accordance with at least some embodiments.

FIG. 11 includes a simplified flowchart 1100 illustrating an example technique for using a dependency model. For example, a change to a particular measure in a particular one of a set of business models can be identified 1105. A dependency model can be identified 1110 that corresponds to the particular business model. The dependency model can be read to identify 1115 one or more relationships between the particular measure and one or more other measures. The dependency model can model either or both of hierarchical and non-hierarchical relationships within and/or between models. The other measures can be modified 1120 based on the identified relationships and in accordance with the change to the particular measure. In some cases, at least some of the other measures can be included in models other than the particular business model and the dependency model can model relationships between the models, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts, structures, architectures, and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium can be a non-transitory medium. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, load balancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system for representing unified graph and hierarchy relationships, the system comprising:
at least one processor; and
memory including instructions that, when executed by the at least one processor, cause the at least one processor to perform operations to:
receive a set of source data that includes a set of internal source data and a set of external source data, wherein the set of source data is received electronically from at least two devices connected to the system via a network, and wherein the set of source data includes entity data and relationship data that indicates associations between entities included in the entity data;
identify an entity in the entity data;
determine a hierarchy for the entity based on the relationship data, wherein the hierarchy includes relational links between the entity and other entities in the set of source data based on an evaluation of the relationship data;
generate an entity graph network that includes a plurality of nodes, wherein the plurality of nodes includes a node for the entity and additional nodes that correspond to each of the other entities included in the hierarchy;
determine a non-hierarchical link between the entity and a related entity based on an evaluation of the relationship data, the related entity not included in the other entities in the set of source data;
update the entity graph network to include the non-hierarchical link, wherein the update includes creation of a node for the related entity and a relational link between the entity and the related entity;
generate a set of measures for the relational link;
configure a set of dependencies between the set of measures for the relational link and a second set of measures of a second relational link of the entity graph network, wherein the second set of measures corresponds to a dependent entity node on the entity graph network;
identify a change to a value of a measure of the set of measures;
determine a computational effect to propagate the change to the value to the set of measures based on the set of dependencies, wherein determining the computational effect includes:
identify a plurality of scopes of data for propagating the change to the value, wherein each scope of data of the plurality of scopes of data has an associated number of computation executions for propagating the change to the value; and
select a scope of data from the plurality of scopes of data with smallest associated number of computation executions;
update a dependent entity node measure value based on the computational effect of the change to the value, the dependent entity node measure value associated with the dependent entity node;
identify that the change to the value of the measure is a temporary change;
create a temporary dependent entity node measure value based on the computational effect of the value of the measure;
present a scenario graphical user interface to a display device that displays at least one computational effect of the temporary dependent entity node measure value;
identify that the temporary change has been discarded; and
update the scenario graphical user interface to remove the at least one computational effect of the temporary dependent entity node measure value.

2. The system of claim 1, the memory comprising instructions that cause the at least one processor to perform operations to:
determine a set of computations to be performed based on the set of measures through use of the relational links for an entity node included in the entity graph network;
identify a scope for the set of computations, wherein the scope indicates one or more other entity nodes effected by a change to a value of at least one measure of the set of measures; and
modify a measure related to the other entity nodes based on a computational rule included in a relational link between the entity node and the one or more other entity nodes.

3. The system of claim 2, the memory comprising instructions that cause the at least one processor to perform operations to:
identify a change to a relational link between the entity node and the one or more entity nodes; and
update the measure based on the change to the relational link.

4. The system of claim 1, wherein the entity graph network shares one or more relational links with a plan graph network, the memory comprising instructions that cause the at least one processor to perform operations to:
identify input drivers representing variables that influence the dependent entity node measure value, wherein the one or more input drivers modify the computational effect of the set of measures; and
update the dependent entity node measure value at least in part based on the input drivers.

5. The system of claim 1, the memory comprising instructions that cause the at least one processor to perform operations to:
present a measure input graphical user interface to a display device; and
receive a measure value input via an interactive user interface element of the measure input graphical user interface, wherein the change to the value of the measure is identified based on the input of the measure value via the interactive user interface element.

6. The system of claim 1, the memory comprising instructions that cause the at least one processor to perform operations to:
present a scenario graphical user interface to a display device that displays a first representation of data represented in the entity graph network based on an original value of the at least one measure and a second representation of the data represented in the entity graph network based on the computational effect of the change to the value of the measure;
receive a hypothetical value for the measure via the scenario graphical user interface; and
update the second representation of the data represented in the entity graph network based on the computational effect of the hypothetical value of the measure.

7. At least one non-transitory machine-readable medium including instructions for representing unified graph and hierarchy relationships that, when executed by at least one processor, cause the at least one processor to perform operations to:
- receive a set of source data that includes a set of internal source data and a set of external source data, wherein the set of source data is received electronically from at least two network connected devices, and wherein the set of source data includes entity data and relationship data that indicates associations between entities included in the entity data;
- identify an entity in the entity data;
- determine a hierarchy for the entity based on the relationship data, wherein the hierarchy includes relational links between the entity and other entities in the set of source data based on an evaluation of the relationship data;
- generate an entity graph network that includes a plurality of nodes, wherein the plurality of nodes includes a node for the entity and additional nodes that correspond to each of the other entities included in the hierarchy;
- determine a non-hierarchical link between the entity and a related entity based on an evaluation of the relationship data, the related entity not included in the other entities in the set of source data;
- update the entity graph network to include the non-hierarchical link, wherein the update includes creation of a node for the related entity and a relational link between the entity and the related entity;
- generate a set of measures for the relational link;
- configure a set of dependencies between the set of measures for the relational link and a second set of measures of a second relational link of the entity graph network, wherein the second set of measures corresponds to a dependent entity node on the entity graph network;
- identify a change to a value of a measure of the set of measures;
- determine a computational effect to propagate the change to the value to the set of measures based on the set of dependencies, wherein determining the computational effect includes:
  - identify a plurality of scopes of data for propagating the change to the value, wherein each scope of data of the plurality of scopes of data has an associated number of computation executions for propagating the change to the value; and
  - select a scope of data from the plurality of scopes of data with smallest associated number of computation executions;
- update a dependent entity node measure value based on the computational effect of the change to the value, the dependent entity node measure value associated with the dependent entity node;
- identify that the change to the value of the measure is a temporary change;
- create a temporary dependent entity node measure value based on the computational effect of the value of the measure;
- present a scenario graphical user interface to a display device that displays at least one computational effect of the temporary dependent entity node measure value;
- identify that the temporary change has been discarded; and
- update the scenario graphical user interface to remove the at least one computational effect of the temporary dependent entity node measure value.

8. The at least one non-transitory machine-readable medium of claim 7, comprising instructions that cause the at least one processor to perform operations to:
- determine a set of computations to be performed based on the set of measures through use of the relational links for an entity node included in the entity graph network;
- identify a scope for the set of computations, wherein the scope indicates one or more other entity nodes effected by a change to a value of at least one measure of the set of measures; and
- modify a measure related to the other entity nodes based on a computational rule included in a relational link between the entity node and the one or more other entity nodes.

9. The at least one non-transitory machine-readable medium of claim 8, comprising instructions that cause the at least one processor to perform operations to:
- identify a change to a relational link between the entity node and the one or more entity nodes; and
- update the measure based on the change to the relational link.

10. The at least one non-transitory machine-readable medium of claim 7, wherein the entity graph network shares one or more relational links with a plan graph network, comprising instructions that cause the at least one processor to perform operations to:
- identify input drivers representing variables that influence the dependent entity node measure value, wherein the one or more input drivers modify the computational effect of the set of measures; and
- update the dependent entity node measure value at least in part based on the input drivers.

11. The at least one non-transitory machine-readable medium of claim 7, comprising instructions that cause the at least one processor to perform operations to:
- present a measure input graphical user interface to a display device; and
- receive a measure value input via an interactive user interface element of the measure input graphical user interface, wherein the change to the value of the measure is identified based on the input of the measure value via the interactive user interface element.

12. The at least one non-transitory machine-readable medium of claim 7, comprising instructions that cause the at least one processor to perform operations to:
- present a scenario graphical user interface to a display device that displays a first representation of data represented in the entity graph network based on an original value of the at least one measure and a second representation of the data represented in the entity graph network based on the computational effect of the change to the value of the measure;
- receive a hypothetical value for the measure via the scenario graphical user interface; and
- update the second representation of the data represented in the entity graph network based on the computational effect of the hypothetical value of the measure.

13. A method for representing unified graph and hierarchy relationships, the method comprising:
- receiving, by a computing device, a set of source data including a set of internal source data and a set of external source data, wherein the set of source data is received electronically from at least two devices connected to the computing device via a network, the set of source data including entity data and relationship data indicating associations between entities included in the entity data;

identifying, by the computing device, an entity in the entity data;

determining, by the computing device, a hierarchy for the entity based on the relationship data, the hierarchy including relational links between the entity and other entities in the set of source data based on an evaluation of the relationship data;

generating, by the computing device, an entity graph network including a plurality of nodes, the plurality of nodes including a node for the entity and additional nodes corresponding to each of the other entities included in the hierarchy;

determining, by the computing device, a non-hierarchical link between the entity and a related entity based on an evaluation of the relationship data, the related entity not included in the other entities in the set of source data;

updating, by the computing device, the entity graph network to include the non-hierarchical link, wherein the updating includes creating a node for the related entity and a relational link between the entity and the related entity;

generating, by the computing device, a set of measures for the relational link;

configuring, by the computing device, a set of dependencies between the set of measures for the relational link and a second set of measures of a second relational link of the entity graph network, the second set of measures corresponding to a dependent entity node on the entity graph network;

identifying, by the computing device, a change to a value of a measure of the set of measures;

determining a computational effect to propagate the change to the value to the set of measures based on the set of dependencies, wherein determining the computational effect includes:

identifying a plurality of scopes of data for propagating the change to the value, wherein each scope of data of the plurality of scopes of data has an associated number of computation executions for propagating the change to the value; and selecting a scope of data from the plurality of scopes of data with smallest associated number of computation executions;

updating a dependent entity node measure value based on the computational effect of the change to the value, the dependent entity node measure value associated with the dependent entity node;

identifying that the change to the value of the measure is a temporary change;

creating a temporary dependent entity node measure value based on the computational effect of the value of the measure;

presenting a scenario graphical user interface to a display device that displays at least one computational effect of the temporary dependent entity node measure value;

identifying that the temporary change has been discarded; and updating the scenario graphical user interface to remove the at least one computational effect of the temporary dependent entity node measure value.

14. The method of claim 13, comprising:

determining a set of computations to be performed based on the set of measures using the relational links for an entity node included in the entity graph network;

identifying a scope for the set of computations, wherein the scope indicates one or more other entity nodes effected by a change to a value of at least one measure of the set of measures; and modifying a measure related to the other entity nodes based on a computational rule included in a relational link between the entity node and the one or more other entity nodes.

15. The method of claim 14, comprising:

identifying a change to a relational link between the entity node and the one or more entity nodes; and updating the measure based on the change to the relational link.

16. The method of claim 8, wherein the entity graph network shares one or more relational links with a plan graph network, the method further comprising:

identifying input drivers representing variables influencing the dependent entity node measure value, wherein the one or more input drivers modify the computational effect of the set of measures; and updating the dependent entity node measure value at least in part based on the input drivers.

17. The method of claim 13, comprising:

presenting a measure input graphical user interface to a display device; and receiving a measure value input via an interactive user interface element of the measure input graphical user interface, wherein the change to the value of the measure is identified based on the input of the measure value via the interactive user interface element.

* * * * *